(12) United States Patent
Leidecker et al.

(10) Patent No.: US 7,477,392 B2
(45) Date of Patent: Jan. 13, 2009

(54) ELECTROMAGNETIC ENERGY MEASUREMENT APPARATUS AND METHOD

(75) Inventors: Cliff J. Leidecker, Rogue River, OR (US); J. Thomas Higgins, Medford, OR (US); Carlo Janssens, Londerzeel (BE); Edward D. Clement, Eagle Point, OR (US)

(73) Assignee: Key Technology, Inc, Walla Walla, WA (US)

( * ) Notice: Subject to any disclaimer, the term of this patent is extended or adjusted under 35 U.S.C. 154(b) by 735 days.

(21) Appl. No.: 11/191,689

(22) Filed: Jul. 27, 2005

(65) Prior Publication Data

US 2007/0052966 A1   Mar. 8, 2007

(51) Int. Cl.
*G01N 21/25* (2006.01)

(52) U.S. Cl. .................. 356/419; 359/634; 359/638; 359/640

(58) Field of Classification Search ............ 356/419, 356/445; 359/634, 633, 636, 638, 639–640; 348/337–339; 353/81

See application file for complete search history.

(56) References Cited

U.S. PATENT DOCUMENTS

| 1,787,269 | A | 12/1930 | Hansen |
|---|---|---|---|
| 2,642,487 | A | 6/1953 | Schroeder |
| 3,718,751 | A | 2/1973 | Landre et al. |
| 4,084,179 | A | 4/1978 | Sekiguchi |
| 4,284,323 | A | 8/1981 | Jankowitz |
| 4,288,148 | A | 9/1981 | Offner et al. |
| 4,412,723 | A | 11/1983 | Shafer |
| 4,541,688 | A | 9/1985 | Watt et al. |
| 4,943,155 | A | 7/1990 | Cross, Jr. |
| 4,968,874 | A | 11/1990 | Kasuga |
| 5,136,417 | A | 8/1992 | Smith |
| 5,327,289 | A | 7/1994 | Watanabe et al. |
| 5,701,203 | A | 12/1997 | Watanabe |
| 5,999,509 | A | 12/1999 | Sugiura et al. |
| 6,611,383 | B1 | 8/2003 | Lee |

FOREIGN PATENT DOCUMENTS

| EP | 1083554 A3 | 3/2001 |
|---|---|---|
| JP | 09121364 A2 | 5/1997 |

OTHER PUBLICATIONS

James W. Howard, Formulas for the Coma and Astigmatism of Wedge Prisms used in Converging Light, Applied Optics, Dec. 1, 1985, pp. 4265-4268, vol. 24, No. 23.
Milton Laikin, Book Titled: "Lens Design Third Edition, Revised and Expanded", Published 2001, ISBN #0-8247-0507-6, Marcel Dekker, Inc. 270 Madison Ave. New York, NY 10016.

*Primary Examiner*—Kara E Geisel
*Assistant Examiner*—Abdullahi Nur
(74) *Attorney, Agent, or Firm*—Mark A. Bauman

(57) ABSTRACT

An electromagnetic energy measurement apparatus and method for measuring first, second, and third wavelength components includes first and second coated optical elements having non-parallel surfaces. Proper selection of the parameters of the optical elements reduces the level of coma and astigmatism in the apparatus. Additionally, filters pass the first, second, and third wavelength components to first, second, and third sensors. Improvement in the alignment of the field of view between sensors is realized by applying an adjustable compressive force on the filters to individually adjust the field of view.

49 Claims, 10 Drawing Sheets

ELECTROMAGNETIC ENERGY MEASUREMENT APPARATUS AND METHOD

BACKGROUND OF THE INVENTION

1. Field of the Invention

This invention relates to an apparatus and method for measuring electromagnetic energy, and more specifically the invention relates to an apparatus and method for providing measurements of electrical energy having multiple wavelength components of electromagnetic energy, and which further provides measurements of electromagnetic energy that exhibit reduced levels of coma and astigmatic aberration effects, and which additionally provides an adjustment apparatus and method for aligning the field of view for measurements of electromagnetic energy.

2. Description of Related Art

Methods and apparatuses for measuring electromagnetic energy are well known in the art. It is often necessary to simultaneously measure intensities of multiple wavelength components of electromagnetic energy at a single spatial point. In addition, it is often useful to measure intensities of multiple wavelength components of electromagnetic energy at multiple spatial points along a line using multiple one-dimensional arrays of detectors to provide simultaneous readings. Furthermore, it is also sometimes necessary to use multiple two dimensional arrays of detectors to provide simultaneous measurement of intensities of multiple wavelength components of electromagnetic energy at multiple spatial points over an area.

A color line scan camera is an example of a measuring apparatus that includes multiple one dimensional arrays of detectors to provide simultaneous measurement of intensities of multiple wavelength components of electromagnetic energy at multiple spatial points along a line. The color line scan camera is useful for providing images of material as it is transported in regular fashion across a conveyor.

Most color line scan cameras employ a beam-splitter to divide the electromagnetic energy into its component parts and route it to the appropriate line scan detector.

Beam-splitters come in an array of types and sizes. A common beam-splitter known in the art is a cube or prism beam type splitter. These beam-splitters are often expensive and may be difficult to employ in infra-red applications. Another approach is to use a plurality of plate-type dichroic mirrors selected to filter and route the electromagnetic energy to the appropriate detector or sensor. Unfortunately, plate-type dichroic mirrors often introduce coma and astigmatism when placed in a convergent beam. This astigmatism and coma, of course, degrades image quality.

Pellicles have also been employed in the construction of beam splitters. In this arrangement, a set of pellicles are arranged to filter and route the electromagnetic energy to the appropriate detector. The pellicle is effective in reducing the amount of coma and astigmatism but is problematic in construction and application. Unfortunately, pellicles are often very delicate and often formed from nitrocellulose plastic having a thickness of less than 10 micrometers. The thickness and delicateness of the pellicles restrict the types of coatings that may be applied. For this reason, often coatings which are necessary to achieve a desired filtering or reflective result for the given electromagnetic energy are not compatible with the pellicle. Alternatively, coated glass pellicles may be used with coatings that are incompatible with the nitrocellulose plastic. However, coated glass pellicles are also difficult to form in a workable fashion in a beam-splitter because the coatings may distort the surface of the glass, resulting in variations of surface flatness which can introduce measurement anomalies.

Additionally, beam-splitters may also introduce chromatic aberrations which result in acuity degradations of the measuring apparatus. These chromatic aberrations distort the field of view and often result in alignment errors between colors or wavelength components.

Despite these various methods and apparatuses, there continues to be a need for a measurement method and apparatus that is able to provide measurements without significant astigmatism and coma distortion, and to provide adjustment for the alignment of the field of view, in a cost effective manner.

SUMMARY OF THE INVENTION

A first aspect of the present invention relates to an apparatus for measuring first, second, and third wavelength components of electromagnetic energy propagating along an incident axis, having a first optical element positioned in intersecting relation to the incident axis, and having a first surface and an opposite second surface, and wherein the first surface and second surface are each positioned in substantially non-parallel relation one to the other, and wherein the first surface reflects a substantial portion of the second and third wavelength components of the electromagnetic energy along a first axis, and wherein the first wavelength component travels through the first optical element along a first path, and wherein the first wavelength component emerges from the first optical element and travels along a second axis that is substantially parallel to the incident axis, and a second optical element positioned in intersecting relation to the first axis, and having a first surface and an opposite second surface, and wherein the first surface and the second surface are each positioned in substantially non-parallel relation one to the other, and further wherein the first surface is configured to reflect a substantial portion of the third wavelength component of the electromagnetic energy along a third image axis, and wherein the second wavelength component travels through the second optical element along a second path, and wherein the second wavelength component emerges from the second optical element and travels along a second image axis that is substantially parallel to the first axis, and wherein the first surface of the first optical element and the first surface of the second optical element are positioned in substantially parallel, predetermined spaced relation one to the other.

Another aspect of the present invention relates to an apparatus for measuring first, second, and third wavelength components of electromagnetic energy propagating along an incident axis, having a first optical element located in intersecting relation to the incident axis, and having a first surface and an opposite second surface, and wherein the first surface and the second surface are configured in substantially non-parallel relation, and further wherein the first surface is configured to substantially reflect the second and third wavelength components of the electromagnetic energy along a first axis, and is further configured to propagate the first wavelength component therethrough along a first path so that the first wavelength component emerges from the first optical element and propagates along a second axis, and wherein the first path has a midpoint, and a second optical element having a first surface and an opposite second surface, and wherein the first surface and the second surface are configured in substantially non-parallel relation, and further wherein the first surface is configured to substantially reflect the third wavelength component of the electromagnetic energy along a third image axis, and is further configured to propagate the second wavelength component therethrough along a second path, so that the second component of electromagnetic energy emerges from the second optical element and propagates along a second image axis, and wherein the second value has a midpoint, and a first sensor having a sensing surface, and is configured to receive the first wavelength component of electromagnetic energy along a first image axis, and a second sensor having a sensing surface, and is configured to receive the second wavelength component of electromagnetic energy along the second image axis; and a third sensor having a sensing surface, and is configured to receive the third wavelength component of the electromagnetic energy along the third image axis.

Still further, another aspect of the present invention relates to an apparatus for measuring first, second, and third wavelength components of electromagnetic energy propagating along an incident axis comprising a first optical element positioned in intersecting relation to the incident axis, and having a first surface and an opposite second surface, and wherein the first surface and second surface are each positioned in substantially non-parallel relation one to the other, and wherein the first surface reflects a substantial portion of the second and third wavelength components of the electromagnetic energy along a first axis, and a second optical element positioned in intersecting relation to the first axis, and having a first surface and an opposite second surface, and wherein the first surface and the second surface are each positioned in substantially non-parallel relation one to the other, and further wherein the first surface is configured to reflect a substantial portion of the third wavelength component of the electromagnetic energy, and wherein a substantial portion of the first and second wavelength components pass through either the first optical element or the second optical element, and a substantial portion of the third wavelength component is reflected by the first optical element and the second optical element.

Moreover, another aspect of the present invention relates to an apparatus for measuring first, second, and third wavelength components of electromagnetic energy propagating along an incident axis having a first optical element having a first and an opposite second substantially non-parallel surface, a second optical element having a first and an opposite second substantially non-parallel surface, and wherein the first and second optical elements have an optical coating where a substantial portion of the first wavelength component is passed by the first optical element, a substantial portion of the second wavelength component is reflected by the first optical element and is passed by the second optical element, and a substantial portion of the third wavelength component is reflected by both the first and second optical elements; and a first sensor positioned in receiving relation to the first wavelength component, a second sensor positioned in receiving relation to the second wavelength component, and a third sensor positioned in receiving relation to the third wavelength component.

Yet further, another aspect of the present invention relates to a method for measuring first, second, and third wavelength components of electromagnetic energy propagating along an incident axis having the steps of providing a first and second optical element each having first and opposite second surfaces oriented in substantially non-parallel relation one to another, and passing a substantial portion of the first wavelength component of electromagnetic energy through the first optical element, and reflecting a substantial portion of the second wavelength component of electromagnetic energy by the first optical element and passing a substantial portion of second wavelength component of electromagnetic energy through the second optical element, and reflecting a substantial portion of the third wavelength component of electromagnetic energy by both the first and second optical elements.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
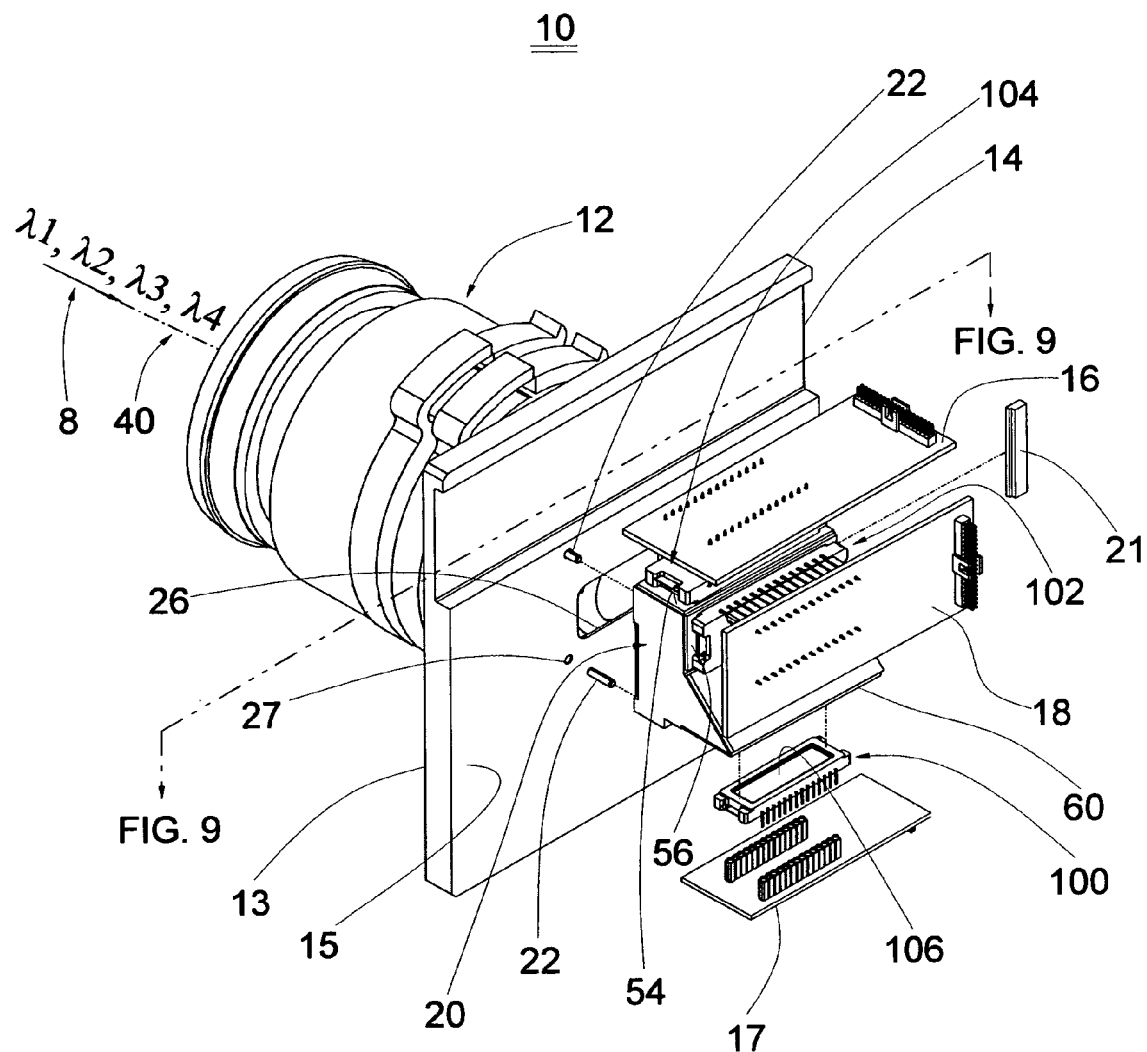
FIG. 1 is a partially exploded rear perspective view of an embodiment of the present invention.

Referring now to FIG. 1, an apparatus 10 for measuring electromagnetic energy 8 is shown. The electromagnetic energy 8 may be considered to be traveling or propagating along an incident axis 40 and may be composed of a number of wavelengths or frequencies representing a spectrum. This spectrum may include a first, second, third and fourth wavelength component generally designated by the characters $\lambda_1$, $\lambda_2$, $\lambda_3$, $\lambda_4$ respectively. For the purposes of this disclosure, an electromagnetic energy component having has a spectral distribution. In one embodiment, the spectral distribution of the first wavelength component $\lambda_1$ is centered at approximately 460 nm and includes the wavelengths between approximately 420 to 500 nm. In another embodiment, the spectral distribution of the first wavelength component $\lambda_1$, is centered at approximately 855 nm and includes the wavelengths between 710 nm to 1000 nm.

Yet further, an electromagnetic energy component having a second wavelength component $\lambda_2$ has a spectral distribution centered at approximately 540 nm and includes all wavelengths between approximately 500 nm to 580 nm. Still further, an electromagnetic energy component having a third wavelength component $\lambda_3$ has a spectral distribution centered at approximately 615 nm and includes all wavelengths between approximately 580 nm to 660 nm. Finally, an electromagnetic energy component having a fourth wavelength component $\lambda_4$ has a spectral distribution centered outside the ranges covered by $\lambda_1, \lambda_2, \lambda_3$.

Still referring to FIG. 1, it will be seen that the electromagnetic energy 8 traveling along the incident axis 40 enters a lens 12. The lens 12 may be a single or multi-optical element lens with a fixed or variable focal distance. The lens 12 may have a fixed magnification or variable magnification depending on the application of the apparatus 10. A plate 14 having a first face 15, and an opposite second face 13, is provided. Further, the plate 14 has an aperture 26 formed therein. The plate 14 is positioned adjacent to the lens 12. The lens 12 may be releasably affixed or lockingly mounted to the second face 13 of the plate 14 depending upon the application or the level of required flexibility to exchange or interchange lenses to meet the requirements of a particular application. In a preferred embodiment, the lens 12 and the plate 14 may be joined together using a bayonet style lens mount which is well known in the art. Other mounting schemes, also known in the art, may be utilized without departing from the teachings of the present invention.

The plate 14 is positioned so that the incident axis 40 passes through the aperture 26, and the first face 15 of the plate 14 is positioned in substantially perpendicular relation relative to the incident axis 40.

A mounting block assembly 20 is borne by the plate 14 and juxtaposed relative to the first face 15. A set of alignment or mating pins 22 are inserted into a plurality of apertures 27 which are formed in the second face 15 of plate 14, and are positioned to extend substantially normally outwardly from the face 15 of the plate 14. The respective pins are arranged to matingly engage substantially coaxially aligned apertures (not shown) which are formed in the mounting block assembly 20. When assembled, the mating pins 22 properly align or otherwise orient the mounting block assembly 20 with the aperture 26 which is formed in the plate 14, and which is configured to pass the electromagnetic energy 8 therethrough.

Figure 2:
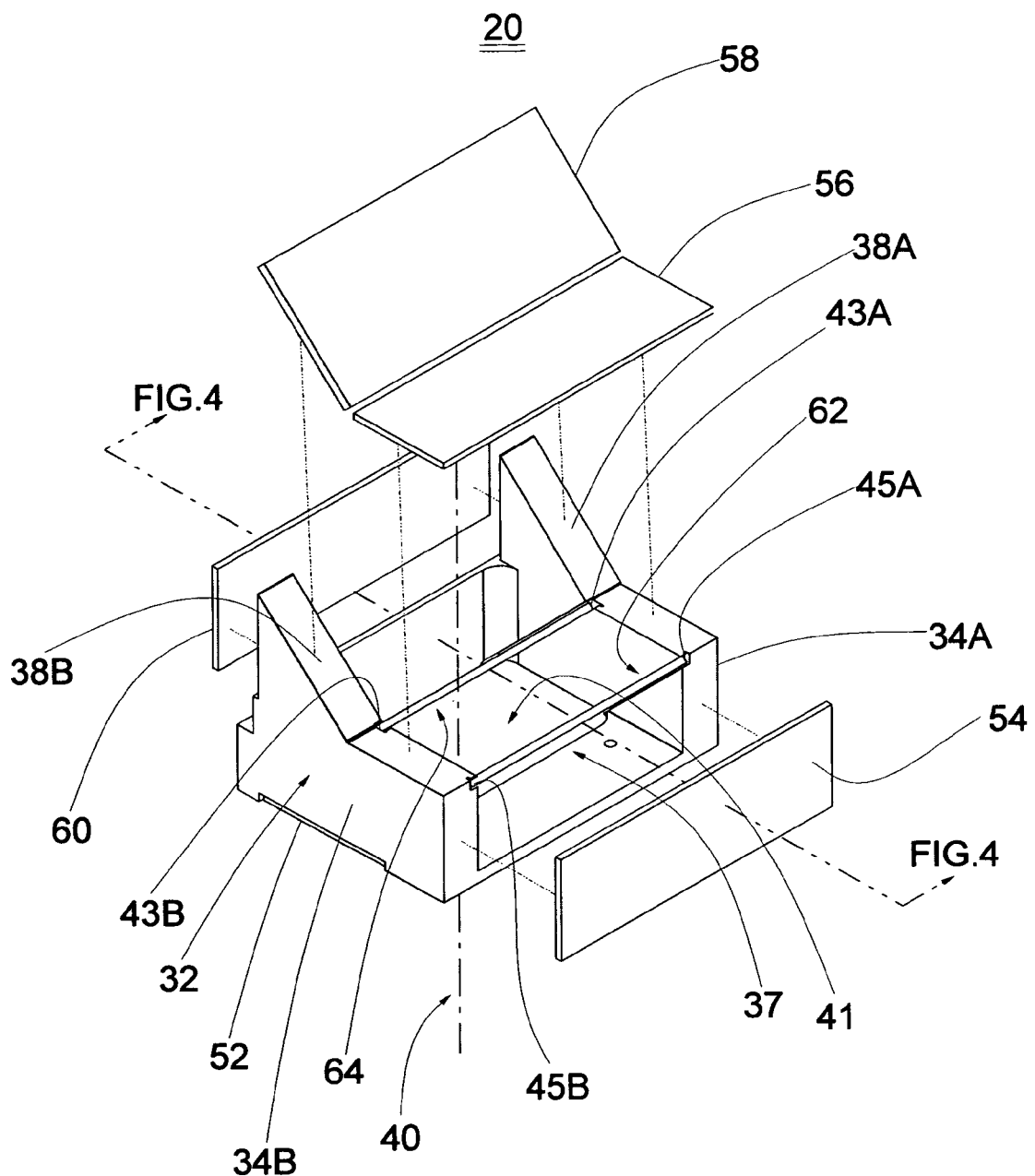
FIG. 2 is a partially exploded, perspective view of a mounting block assembly utilized in an embodiment of the present invention.
Figure 3:
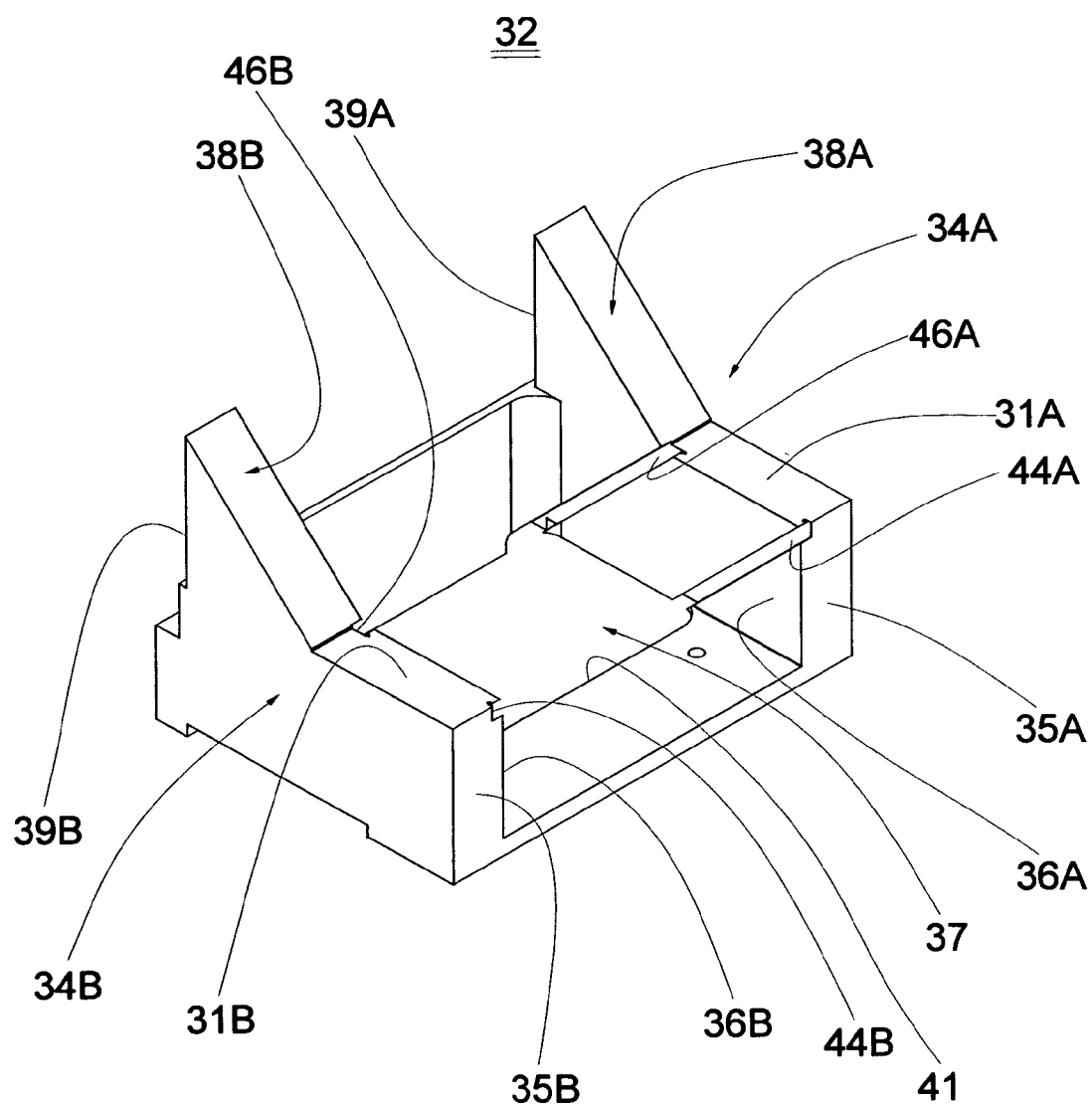
FIG. 3 is a perspective, fragmentary view of a mounting block utilized in the mounting block assembly as seen in FIG. 2.

Referring now to FIG. 2 and FIG. 3, the mounting block assembly 20 is oriented such that the incident axis 40 (FIG. 1) is positioned within an aperture 41 of the mounting block 32. The mounting block 32 has a first and an opposite, second wall, 34A and 34B respectively. Each wall 34A and 34B has an outer peripheral surface, 38A and 38B, and a first face 36A and an opposite second face 36B which defines a channel or passageway 37 therebetween. From an inspection of FIG. 2, it may be observed that the incident axis 40 passes through the channel or passageway 37.

Referring now to FIG. 1, FIG. 2, and FIG. 3, the mounting block assembly 20 includes a mounting block 32 that has a pair of first optical element mounting surfaces or troughs, 46A and 46B (FIG. 3), formed into each of the first faces 36A and 36B of the first and second walls 34A and 34B. The mounting surfaces or troughs 46A and 46B are configured to slidingly receive and otherwise appropriately orient a first optical element 64. This first optical element has opposite edges 43A and 43B respectively. Similarly, the mounting block 32 has a pair of second optical element mounting surfaces or troughs, 44A and 44B, formed into each of the first faces 36A and 36B of the first and second walls 34A and 34B. The mounting surfaces or troughs 44A and 44B are configured to slidingly receive a second optical element 62. The mounting block assembly 20 includes first filter mounting surfaces 39A and 39B, and second filter mounting surfaces 35A and 35B that are formed as part of a pair of outer peripheral surfaces 38A and 38B of the first and second walls 34A and 34B of the mounting block 32.

Figure 6:
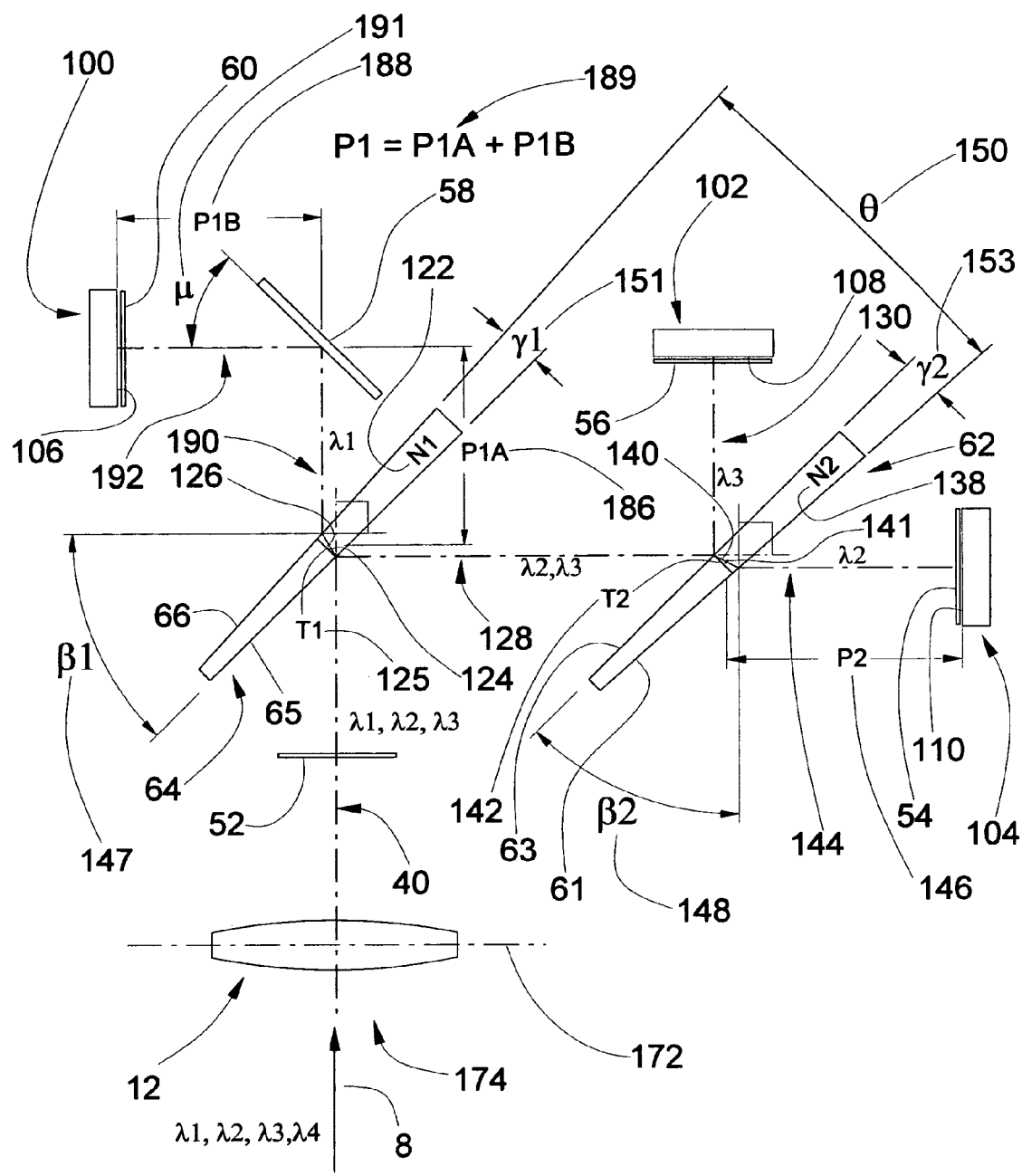
FIG. 6 is an optical schematic view of the present invention.

Referring to FIG. 6, the mounting block assembly 20 is constructed to divide and direct the electromagnetic energy 8 according to the respective wavelength components. For example, a substantial portion of electromagnetic energy 8 having a first wavelength component $\lambda_1$ passes through the first optical element 64 and is routed through a first filter 60 to a sensing surface 106 (FIG. 1) of a first sensor 100. This sensor 100 is mounted to a first interface circuit board 17 (FIG. 1). The first sensor 100 is affixed to first filter 60, and the first filter 60 is affixed to the surfaces 39A and 39B as discussed above.

Figure 4:
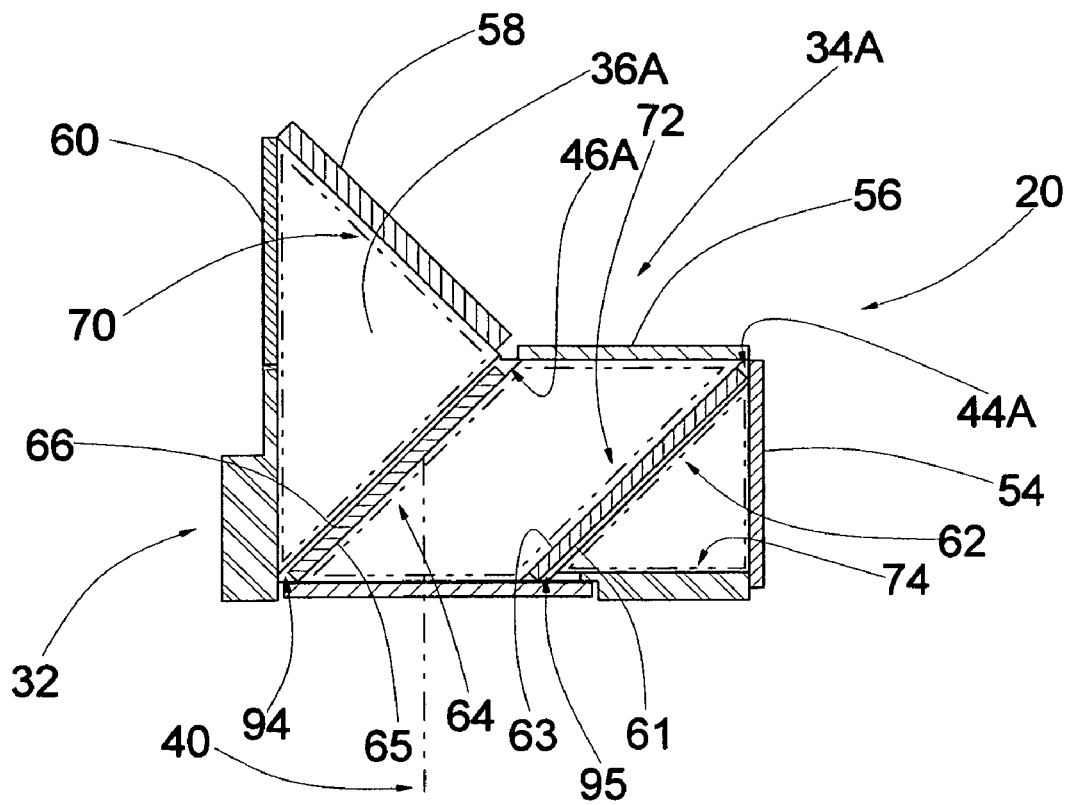
FIG. 4 is a transverse, vertical, sectional view of the assembled mounting block assembly.

A substantial portion of the electromagnetic energy 8 having a second wavelength component $\lambda_2$ is reflected by the first optical element 64 and passes through the second optical element 62, and is then routed through a second filter 54 to another sensing surface (not shown) of a second sensor 104; this second sensor 104 is mounted to a second interface circuit board 16 (FIG. 1). The second sensor 104 is affixed to the second filter. As seen in FIG. 4, the second filter 54 is affixed to the surfaces 35A and 35B.

A substantial portion of the electromagnetic energy 8 having a third wavelength component $\lambda_3$ is reflected by the first optical element 64, and by the second optical element 62, and is routed through a third filter 56 (FIG. 4) to a sensing surface (not shown) of a third sensor 102. The third sensor 102 (FIG. 6) is mounted to a third interface circuit board 18 (FIG. 1). The third sensor 102 is affixed or juxtaposed relative to the third filter 56. Further, the third filter 56 is affixed to the pair of surfaces 31A and 31B which are defined by the outer peripheral surfaces 38A and 38B.

Referring now to FIG. 2, FIG. 3, and FIG. 4, the first optical element 64 is shown positioned within the channel or passageway 37 of the mounting block 32 in intersecting relation to the incident axis 40. The first optical element 64 is aligned or otherwise oriented in the mounting block 32 by means of the first pair of troughs 46A and 46B which are formed into the faces 36A and 36B of the mounting block 32. The first optical element 64 has a first surface 65, and an opposite second surface 66 which are each positioned in substantially non-parallel relation one relative to the other. In this specification, a pair of surfaces in substantially non-parallel relation means that the preponderance of the area of each surface is oriented at a non-zero angle relative to one-another. The angular relation between the first surface 65, and the second surface 66 is selected to decrease the amount of astigmatism and coma measured by the apparatus 10. This aspect of the invention will be discussed in further detail later in this specification.

The first surface 65 of the first optical element 64 is configured to reflect a substantial portion of the second wavelength component $\lambda_2$, and the third wavelength component $\lambda_3$ of the electromagnetic energy 8. In one embodiment of the invention, the first optical element 64 is formed from a plate of BK7 glass that is coated with a dichroic coating which imparts optical chromatic characteristics that allow a substantial amount of the first wavelength component $\lambda_1$ to pass or propagate through the first optical element 64, while simultaneously reflecting a substantial amount of the second wavelength component $\lambda_2$, and the third wavelength component $\lambda_3$. The dichroic coating may be deposited on the first surface 65 of the first optical element 64. Additionally, the dichroic coating may also be deposited on the second surface 66 of the first optical element 64 to improve optical element manufacturing yields. The optical element 64 may similarly formed using a variety of optical materials known in the art including but not limited to optical glass, polycarbonate, acrylic, and acetal, polystyrene, and polymethylmethacrylate that is coated with a dichroic coating.

The second optical element 62 is aligned, or otherwise appropriately oriented in the mounting block 32 by means of the second pair of troughs 44A and 44B which are formed into the faces 36A and 36B of the mounting block 32. This pair of troughs are configured to matingly accept the first edge 45A, and opposite, second edge 45B of the second optical element 62. The second optical element 62 has a first surface 63, and an opposite second surface 61 (FIG. 6). The respective surfaces are positioned in substantially non-parallel relation one relative to the other. The angular relation between the first surface 63 and the second surface 61 is selected so as to substantially decrease the amount of astigmatism and coma measured by the apparatus 10. This feature will be discussed in further detail later in this specification. The first surface 61 of the second optical element 62 is configured so as to reflect a substantial portion of the third wavelength component $\lambda_3$ of the electromagnetic energy 8. In the preferred embodiment, the second optical element 62 is formed from a plate of BK7 glass which is coated with a dichroic coating having optical characteristics which permit a substantial amount of the second wavelength component $\lambda_2$ to pass or otherwise propagate through the second optical element 62, while simultaneously reflecting a substantial amount of the third wavelength component $\lambda_3$. The dichroic coating may be deposited on the first surface 63 of the second optical element 62. Additionally, the dichroic coating may also be deposited on the second surface 61 thereof to increase the yield during the manufacturing process of the optical element 62. The optical element 64 may similarly formed using a variety of optical materials known in the art including but not limited to optical glass, polycarbonate, acrylic, acetal, polystyrene, and polymethylmethacrylate that is coated with a dichroic coating.

Still referring to FIG. 2, FIG. 3, and FIG. 4, a mirror 58 is borne by the outer peripheral surface 38A and 38B of the first and second walls 34A and 34B of the mounting block 32. The mirror 58 is configured to reflect that portion of the first wavelength component $\lambda_1$ of electromagnetic energy 8 that has passed, or otherwise propagated through the first optical element 64. The first filter 60, as earlier discussed, is borne by the surface 39A and 39B, and is configured to pass a substantial portion of first wavelength component $\lambda_1$ of electromagnetic energy 8 that is reflected by the mirror 58. Further, the second filter 54, as earlier discussed, is borne by the surface 35A and 35B of the first and second wall 34A and 34B. The second filter 54 is selected so that it has an optical bandpass characteristic which allows the passage or propagation of a substantial portion of the second wavelength component $\lambda_2$ of electromagnetic energy 8 that has previously passed through the second optical element 62. As seen in FIG. 4, a third filter 56 is shown, and which is borne by the outer peripheral surface 38A and 38B of the first and second wall 34A and 34B. The third filter 56 is selected so that it has a characteristic bandpass that is configured to pass or propagate a substantial portion of the third wavelength component $\lambda_3$ of electromagnetic energy 8 that was reflected by the first and second optical elements 64 and 62 respectively. The filters 60, 54 and 56 are commonly referred in the art as "trim" filters. As a general matter, these "trim" filters improve the accuracy of the division which is made between the various wavelength components in the apparatus 10. The filters 60, 54 and 56 are formed by coating a variety of optical materials known in the art including but not limited to optical glass, polycarbonate, acrylic, acetal, polystyrene, and polymethylmethacrylate.

Referring now to FIG. 4, the mirror 58; the first filter 60; and the first optical element 64 generally defines or borders a first substantially triangular perimeter and substantially planar boundary 70. The first perimeter or planar boundary is generally defined by a plurality of courses which extend along the first face 36A of the first wall 34A; and is further bounded by the intersection of the first optical element 64 to the first face 36A of the first wall 34A. This boundary further extends to the intersection of the mirror 58 and the first face 36A of the first wall 34A. This same boundary also continues to the intersection of the first filter 60, and along to the first face 36A of the first wall 34A. The boundary extends to the first optical element 64 along the first face 36A of the first wall 34A.

Still referring to FIG. 4, the first optical element 64, the second optical element 62, and the third filter 56 generally define or border three sides of a second substantially planar boundary 72 that has a shape that is similar to a parallelogram. The second planar boundary 72 is defined by a plurality of courses which extend along the first face 36A of the first wall 34A; and is further bounded by the intersection of the first optical element 64 to the first face 36A of the first wall 34A. The boundary extends along the intersection of the third filter 56 and the first face 36A of the first wall 34A. The boundary also continues along the intersection of the second optical element 62 to the first face 36A of the first wall 34A, and further extends along the first face 36A of the first wall 34A, to the first optical element 64.

Referring still to FIG. 4, the second optical element 62, and the second filter 54 generally define or border two sides of a third substantially planar boundary 74 that has a shape that is substantially triangular. The third planar boundary 74 is defined along the first face 36A of the first wall 34A, and is further bounded by the intersection of the second optical element 64 to the first face 36A of the first wall 34A. The boundary extends along the intersection of the second filter 54 to the first face 36A of the first wall 34A. The boundary additionally extends along the first face 36A of the first wall 34A to the second optical element 62.

Figure 5:
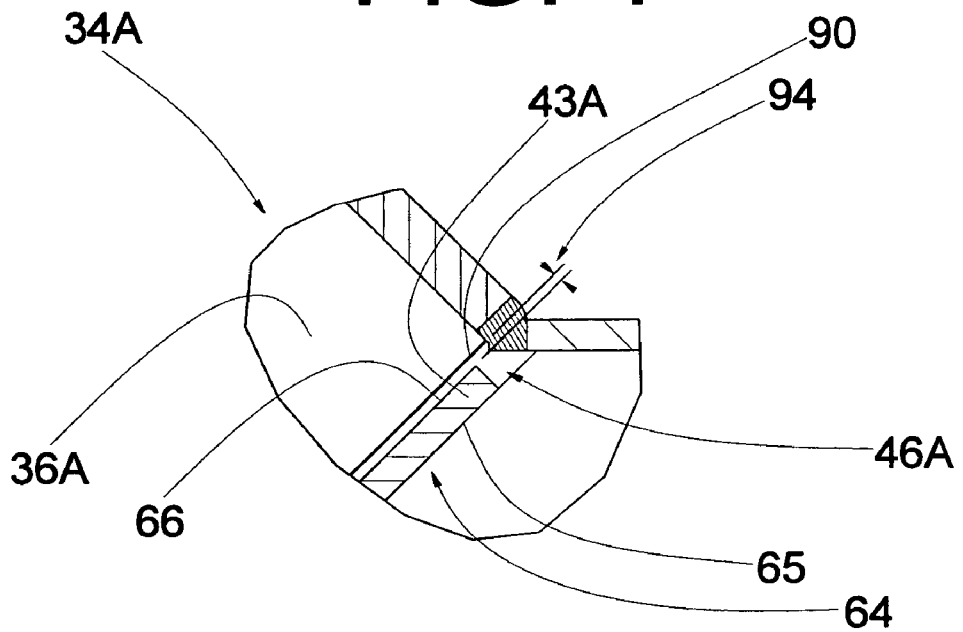
FIG. 5 is a fragmentary, greatly enlarged, vertical sectional view of an optical element positioned within the mounting block assembly.

Referring now to FIG. 4 and FIG. 5, as earlier discussed, the edge 43A of the first optical element 64 is positioned within the trough 46A. From inspection of the figures, it should be readily apparent that a portion of the first surface 65 of the first optical element 64 is secured to, and otherwise is disposed in nested relation thereagainst, the trough 46A. By careful inspection of FIG. 5, it can be seen that the thickness of the first optical element 64 is less than the width of the trough 46A. This leaves a clearance gap 94. The presence of the clearance gap 94 provides a volume that allows the second surface 66 of the first optical element 64 to float or not be constrained by the trough 46A. The trough 46B formed into the second face 36B of the second wall 34B is similarly arranged so that the first surface 65 of the first optical element 64 is constrained by the trough 46B while the second surface 66 of the first optical element 64 is not similarly constrained and is allowed to float within the trough 46B. The second optical element 62 is similarly arranged in its respective trough 44A and 44B so that the thickness of the second optical element 62 is less than the width of troughs 44A and 44B so that when the first surface 63 of the second optical element 62 is constrained by the troughs 44A and 44B a clearance gap 95 allows the second surface 61 of the second optical element 62 to float and not be constrained by the troughs 44A and 44B. This arrangement allows for differences in thermal expansion between the first and second optical elements, 64 and 62, and the mounting block 32 to have a negligible impact on the overall performance of the apparatus 10. In a preferred embodiment, the clearance gaps 94 and 95 are less than about 0.2 millimeters.

Referring now to FIG. 6, which is a schematic representation of the measuring apparatus 10, it will be seen that the incident axis 40 intersects the lens 12, which has a transverse axis labeled 172, at substantially the midpoint or central position of the lens 12. The lens 12 is located at a given distance from the fourth filter 52. The fourth filter 52 is configured to pass the first, second, and third wavelength components $\lambda_1$, $\lambda_2$, $\lambda_3$ of the electromagnetic energy 8. In a preferred embodiment, the fourth filter 52 is a high pass filter that substantially passes or propagates electromagnetic radiation having wavelength components which include $\lambda_1$, $\lambda_2$, $\lambda_3$ while substantially blocking or reflecting $\lambda_4$.

The first sensor 100 (FIG. 1 and FIG. 6) has a sensing surface 106, which is located proximate to the first filter 60. The first sensor 100 is configured to receive the first wavelength component $\lambda_1$ of electromagnetic energy 8 along a first image axis 192. The second sensor 104 has a sensing surface 110, and which is located proximate to the second filter 54. The second sensor is configured to receive the second wavelength component $\lambda_2$ of electromagnetic energy 8 along a second image axis 144. The third sensor 102 has a sensing surface 108, and which is located proximate to a third filter 56. The third sensor 102 is configured to receive the third wavelength component $\lambda_3$ of the electromagnetic energy 8 along a third image axis 130. In a preferred embodiment, each of the first, second, and third sensors 100, 104, and 102 respectively, are charge coupled devices (CCD's) having at least one hundred detection optical elements or pixels whose active area is arranged in a line along the sensing surface of the respective sensor. In a preferred embodiment, the first, second, and third filters 60, 54, and 56 are bandpass filters which are each configured to pass a substantial portion of each of the first, second, and third wavelength components $\lambda_1$, $\lambda_2$, $\lambda_3$ of the electromagnetic energy 8.

Still referring to FIG. 6, the mirror 58 is positioned in intersecting relation relative to the first image axis 192; and a second axis 190 at an angle $\mu$ relative to the first image axis 192. The angle $\mu$ is generally designated by the numeral 191.

The first optical element 64 is located in intersecting relation relative to the incident axis 40. The first surface 65, and the second surface 66 are configured in non-parallel relation at an angle $\gamma_1$, and which is generally designated by the reference 151. The first surface 65 of the first optical element 64 is configured to substantially reflect the second and third wavelength components, $\lambda_2$, $\lambda_3$, of the electromagnetic energy 8 along a first axis 128. The first optical element 64 is also configured to propagate or pass the first wavelength component $\lambda_1$ therethrough and along a first path 124 having a midpoint 126. The first wavelength component $\lambda_1$ emerges from the first optical element 64, and propagates or travels along a second axis 190 that is oriented in a substantially parallel orientation relative to the incident axis 40.

The second optical element 62 is located in intersecting relation to the first axis 128. The first surface 63 and the second surface 61 are configured in non-parallel relation and are oriented at an angle $\gamma_2$ which is generally designated by the reference numeral 153. The first surface 63 of the second optical element 62 is configured to substantially reflect the third wavelength component $\lambda_3$ of the electromagnetic energy 8 along the third image axis 130. The second optical element 62 is also configured to propagate or pass the second wavelength component $\lambda_2$ therethrough, and along a second path 140, and which has a midpoint 141. The second component $\lambda_2$ of electromagnetic energy 8 emerges from the second optical element 62, and propagates or travels along the second image axis 144.

The angle $\beta_1$ and which is generally designated by the reference 147 is measured parallel to the first surface 65 of the first optical element 64, and normal to the second axis 190, or parallel to the first axis 128. A distance $P_{1A}$ is substantially equal to an air equivalent distance of the first wavelength component $\lambda_1$ from the midpoint 126 of the line 124 in a direction parallel to the axis 190, and to the intersection of the mirror 58 and the axis 190. A distance $P_{1B}$ is substantially equal to an air equivalent travel distance of the first wavelength component $\lambda_1$ from the intersection of the axis 192 and the mirror 58 in a parallel direction along the axis 192, to the sensing surface 106 of the first sensor 100. Another air equivalent distance $P_1$ is equal to the sum of $P_{1A}$ and $P_{1B}$ as shown in the relation 189 in FIG. 6. The first optical element 64 has a thickness value $T_1$ generally indicated by the numeral 125 that is measured at the intersection of the incident axis 40 to the first surface 65 of the first optical element 64. The first optical element 64 has a refractive index value for the first wavelength component, $N_1$ generally designated by the numeral 122. Using these variables, the angle $\gamma_1$ defined in radians for the first optical element 64 may be selected using the formula developed by De Lang to provide a reduced level of astigmatism using the following relationship:

$$\gamma_1 = \left[ \frac{\sin\beta_1(\cos^2\beta_1)T_1}{2*(N_1^2 - \sin^2\beta_1)(P_1)} \right]$$

Still referring to FIG. 6, an angle $\beta_2$ which is generally designated by the reference 148 is measured parallel to the first surface 63 of the second optical element 64, and substantially normal to the second image axis 144. An air equivalent distance $P_2$ is substantially equal to an air equivalent travel distance of the second wavelength component $\lambda_2$ from the midpoint 141 of the line 140, in a direction which is parallel to the axis 144, and to the sensing surface 110 of the second sensor 104. The second optical element 62 has a thickness value $T_2$ which is generally indicated by the numeral 142, and which is measured at the intersection of the incident axis 128 to the first surface 63 of the first optical element 62. The second optical element 62 has a refractive index value for the second wavelength component, $N_2$, which is generally designated by the numeral 138. Using these variables, the angle $\gamma_2$ defined in radians for the second optical element 62 may be selected using the formula developed by De Lang to provide a reduced level of astigmatism from the following relationship:

$$\gamma_2 = \left[ \frac{\sin\beta_2(\cos^2\beta_2)T_2}{2*(N_2^2 - \sin^2\beta_2)(P_2)} \right]$$

Continuing to refer to FIG. 6, the second surface 66 of the first optical element 64 is positioned at an angle, $\Theta$ which is generally designated by the numeral 150, and which is measured from the second surface 61 of the second optical element 62 and surface 66, and which is equal to the sum of the angle $\gamma_1$ 151 and the angle $\gamma_2$ 153. The magnitude of the angle $\Theta$ 150 measured in radians is substantially defined by the relationship:

$$\theta = \frac{1}{2}\left[\frac{\sin\beta_1(\cos^2\beta_1)T_1}{(N_1^2 - \sin^2\beta_1)P_1} + \frac{\sin\beta_2(\cos^2\beta_2)T_2}{(N_2^2 - \sin^2\beta_2)P_2}\right] + \left|\frac{\pi}{2} - (\beta_1 + \beta_2)\right|$$

When the thickness value $T_1$ 125, and the thickness value T2 142 are equal, the angle θ 150 may be computed using the following relationship:

$$\theta = \frac{T_1}{2}\left[\frac{\sin\beta_1(\cos^2\beta_1)}{(N_1^2 - \sin^2\beta_1)(P_1)} + \frac{\sin\beta_2(\cos^2\beta_2)}{(N_2^2 - \sin^2\beta_2)P_2}\right] + \left|\frac{\pi}{2} - (\beta_1 + \beta_2)\right|$$

Still referring to FIG. 6, in one embodiment of the invention, the first surface 65 of the first optical element 64 is oriented in parallel relation relative to the first surface 63 of the second optical element 62. In addition, the angle $\beta_1$ 147 is selected to have a magnitude equal to forty-five degrees. In this embodiment, the angle $\beta_2$ 148 is also equal to forty-five degrees. In addition, the thickness value $T_1$ 126 is equal to the thickness value $T_2$ 142. Therefore, in this embodiment of the invention, the magnitude of the angle Θ 150 as measured in radians is substantially defined by the relationship:

$$\theta = \frac{T_1}{2\sqrt{2}}\left[\frac{1}{(2N_1^2 - 1)P_1} + \frac{1}{(2N_2^2 - 1)P_2}\right]$$

In one embodiment of the invention, the thickness value, $T_1$ 125 is approximately equal to one millimeter. In addition, the angle $\gamma_1$ 151 is approximately 0.0034 radians; and the angle $\gamma_2$ 153 is approximately 0.0079 radians. Yet further, it has been found that the ratio of the angle $\gamma_2$ 153 to the angle $\gamma_1$ 151 is less than 3.0. Further the angle θ 150 lies within a range of less than 0.02 radians, and greater than about 0.005 radians, and in one embodiment of the invention, is approximately 0.0113 radians.

Figure 7:
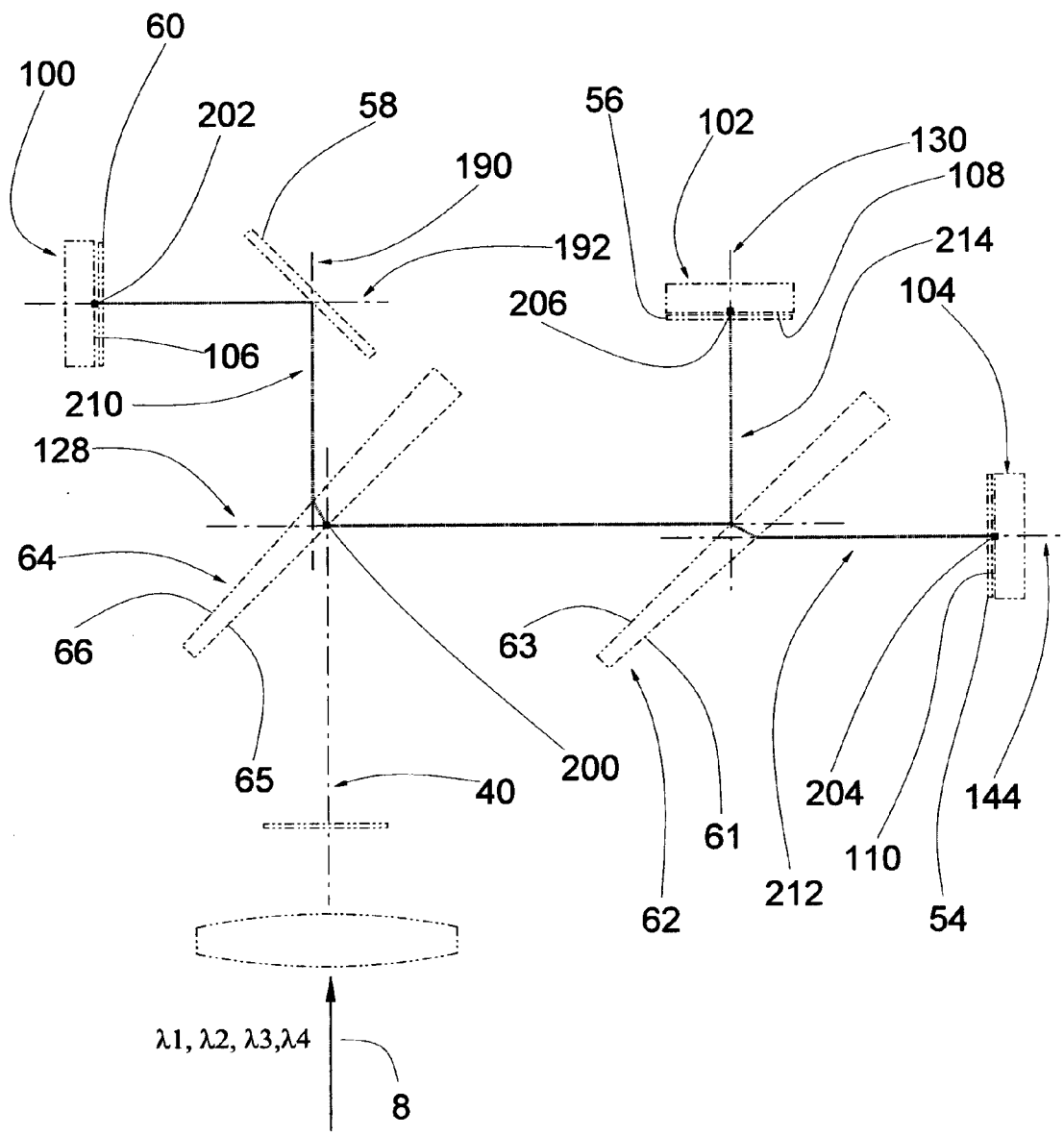
FIG. 7 is an optical schematic view showing the propagation paths for a first, second, and third wavelength component.

Referring now to FIG. 7, a first wavelength path 210 for the first wavelength component $\lambda_1$ begins from a point generally designated by the numeral 200 that corresponds to the intersection of the incident axis 40 to the first surface 65 of the first optical element 64. This first wavelength path 210 extends through the first optical element 64 to the second surface 66 of the first optical element 64, and further extends from the second surface 66 of the first optical element 64 to the mirror 58. The optical path then extends from the mirror 58 to the first filter 60. This first wavelength path further extends through the first filter 60, and to a point generally designated by the numeral 202 which is located on the sensing surface 106 of the first sensor 100.

Continuing to refer to FIG. 7, a second wavelength path 212 for the second wavelength component $\lambda_2$ begins from the point 200, and extends to the first surface 63 of the second optical element 62, and then further extends through the second optical element 62 to the second surface 61 of the second optical element 62. The second wavelength path 212 thereafter extends to and through the second filter 54. The second wavelength path 212 further extends to a point generally designated by the numeral 204 which is located on the sensing surface 110 of the second sensor 104.

A third wavelength path 214 for the third wavelength component $\lambda_3$ begins from the point 200, and then extends to the first surface 63 of the second optical element 62, and further extends from the first surface 63, of the second optical element 62 to the third filter 56. The third wavelength path 214 then extends through the third filter 56 and to a point generally designated by the numeral 206 which is located on the sensing surface 108 of the third sensor 102.

Figure 8:
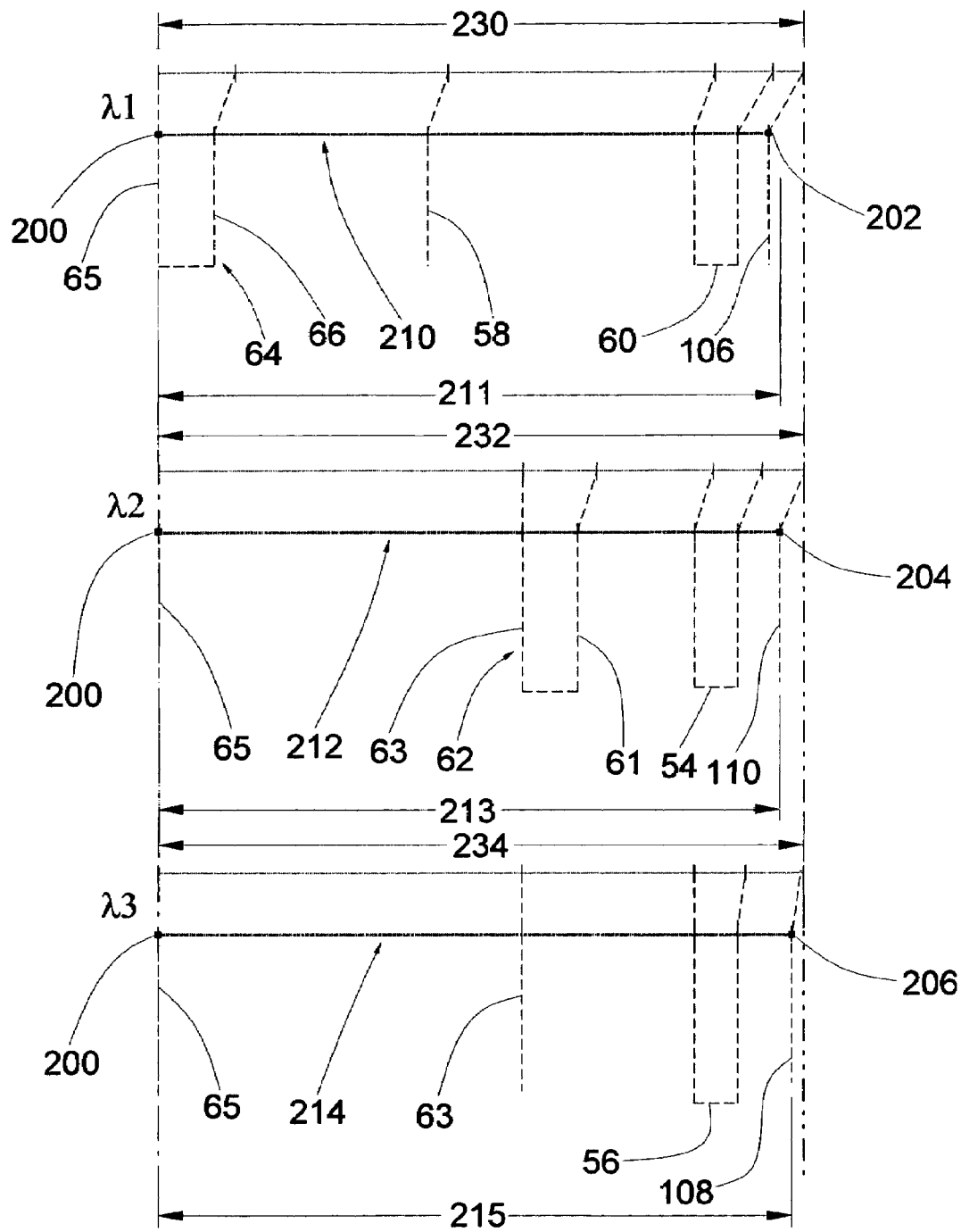
FIG. 8 is a graphical representation of the relationship which exists between a physical distance and an air equivalent distance for three distinct wavelengths as provided by the present invention.

Referring now to FIG. 8, the first wavelength path 210 has a first physical distance dimension which is generally indicated by the numeral 211. A first air equivalent distance 230 is calculated by adding the first physical distance dimension 211, to a set of correction values for portions of the first wavelength path 210 that pass through materials other than air. The second wavelength path 212 has a second physical distance dimension which is generally indicated by the numeral 213. A second air equivalent distance 232 is calculated by adding the second physical distance dimension 213 to a set of correction values for portions of the second wavelength path 212 that pass through materials other than air. The third wavelength path 214 has a third physical distance dimension which is generally indicated by the numeral 215. A third air equivalent distance 234 is equal to the third physical distance dimension 215 because the third wavelength path 214 passes through air throughout its entirety. The correction values for various materials may be computed using methods that are well known in the art.

As can be seen from an inspection of FIG. 8, the sensing surfaces of the first, second, and third sensors 106, 110, and 108 respectively, are each positioned so that the first, second, and third air equivalent distances 230, 232, and 234 are substantially equal in value.

Figure 9:
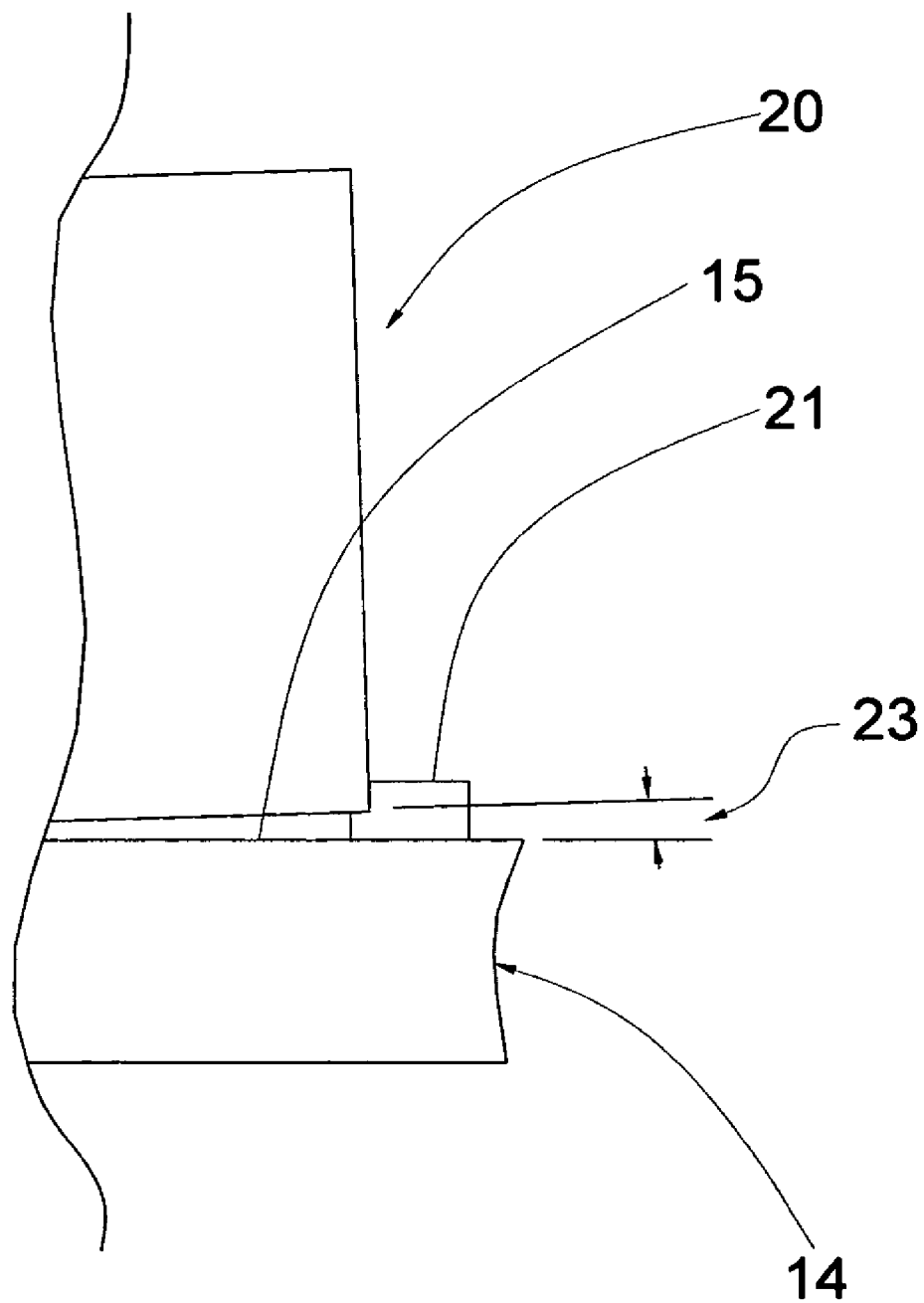
FIG. 9 is a partial, fragmentary, greatly enlarged, cross sectional view of an embodiment of the present invention showing a spacing block positioned between a plate and the mounting block assembly.

Referring now to FIGS. 1 and 9, an adjustment block 21 is shown and which is positioned between one side of the block assembly 20, and the plate 14. The adjustment block 21 has a shelf which is configured to hold the block assembly 20 at an angle generally referred by the numeral 23 relative to the plate 14. The block 21 is configured to produce an angle 23 which minimizes the Scheimpflug effect.

Figure 10:
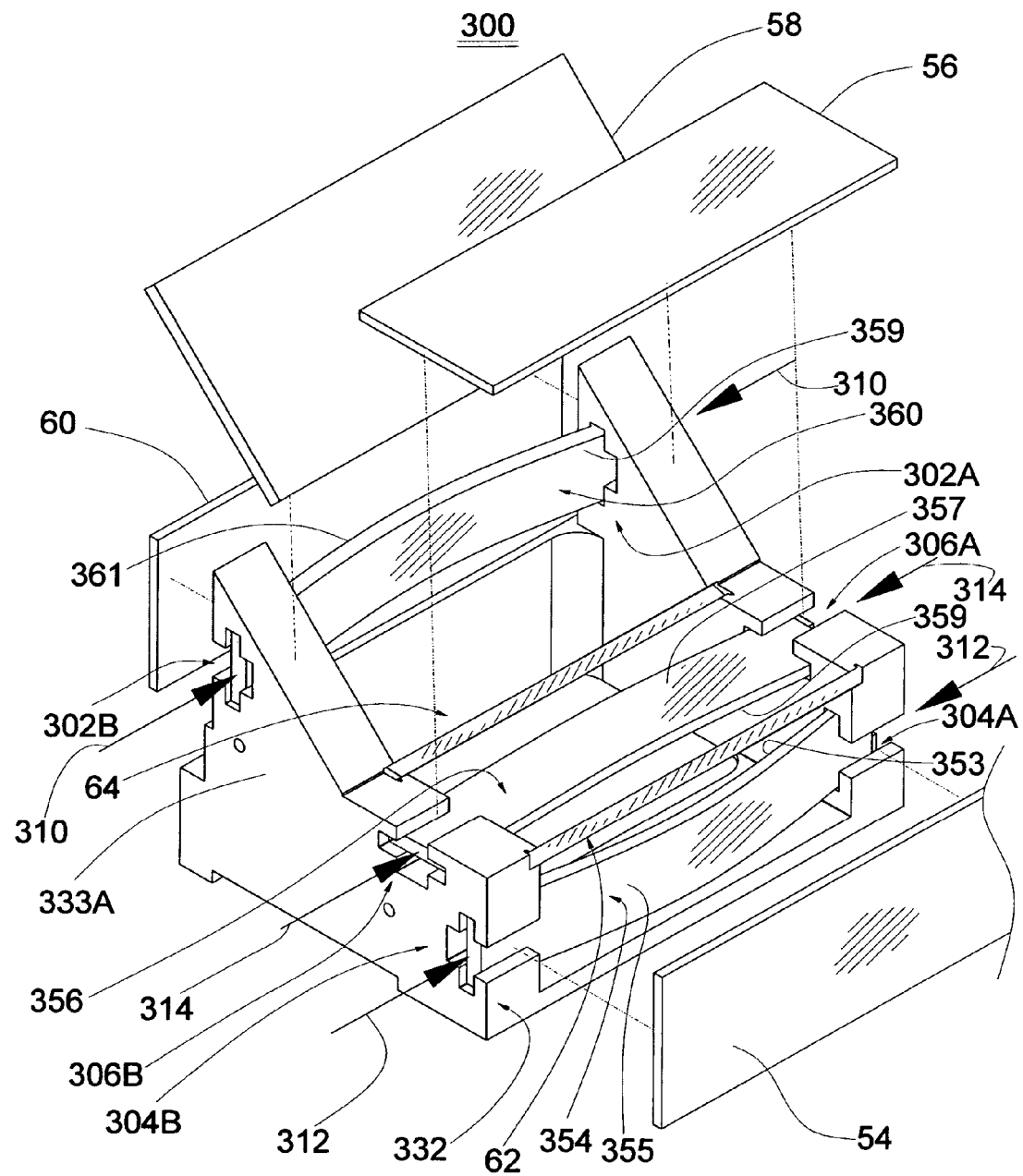
FIG. 10 is a partially exploded, perspective view of a second embodiment of the mounting block assembly with a pair of retention plate assemblies removed.
Figure 11:
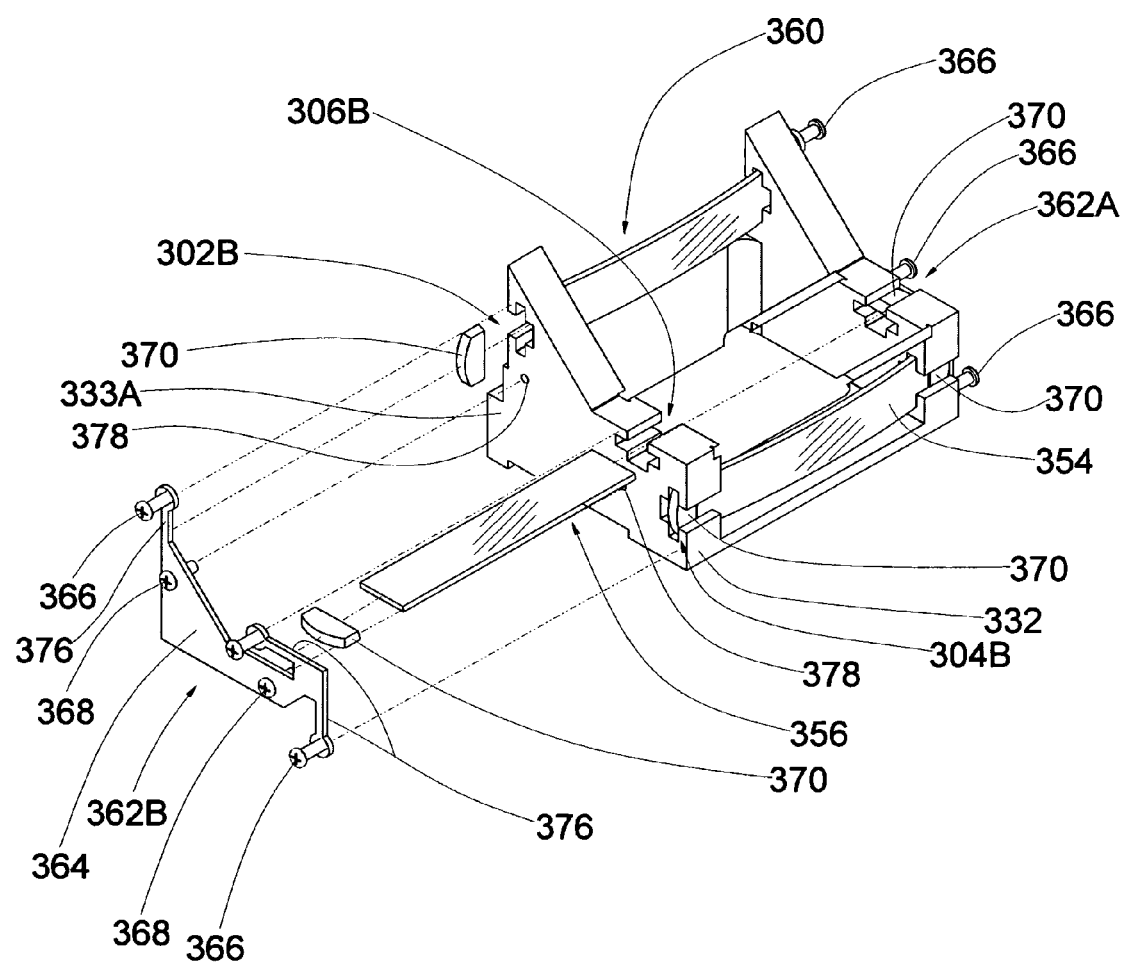
FIG. 11 is a partially exploded perspective view of a second embodiment of the mounting block assembly with some of the optical elements, mirror, and filters removed.

Referring now to FIG. 10 and FIG. 11, another embodiment of the mounting block assembly is shown and which is generally indicated by the numeral 300. The assembly 300 includes a mounting block 332 which is similar in size and function to the mounting block 32 shown in FIG. 3. The mounting block 332 has a pair of outer surfaces 333A only one of which is shown. The mounting block 332 is arranged in a fashion so as to position and align the first optical element 64, the second optical element 62, and the mirror 58 as previously discussed. The first, second, and third filters 60, 54, and 56 are mounted on the mounting block 332 is a similar manner to that discussed earlier in this specification.

The mounting block assembly 300 includes first, second, and third windows respectively designated by the numerals 360, 356, and 354. The first window 360 is configured to pass a substantial portion of the electromagnetic energy 8 (FIG. 1) that is reflected by the mirror 58. The first window 360 has a sensor side 361 and an opposite optical element side 359. The ends of the first window 360 are each positioned in the mounting block 332 through a pair of passages 302A and 302B. Each passage 302A and 302B is formed in the mounting block 332 to slidingly receive the first window 360. A retention plate assembly 362A and 362B (FIG. 11) and pressure block 370 (FIG. 11) are assembled to the mounting block 332 and serve to apply an adjustable compressive force, generally indicated by the numeral 310, to the first window 360 causing the first window 360 to assume an arcuately shaped configuration or curvature. The first window 360 may be positioned so that a secant passing through the first window 360 may be positioned on either the sensor side 361 or the optical element side 359. The curvature in the first window 360 transforms the window 360 into a substantial anisotropic lens which has been found useful in adjusting the field of view of the present invention. The first window 360 is constructed of optical material that can withstand the compressive force 310. The first window 360 is formed using optical materials known in the art including but not limited to glass, polycarbonate, acetal, polystyrene, and acrylic. A coating may also be applied to the first window 360 to modify optical transmission or reflection characteristics without departing from the scope of this invention.

The second window 354 is configured to pass a substantial portion of the second wavelength component λ2 of electromagnetic energy 8 (FIG. 1) that is reflected by the first optical element 64 and which passes through the second optical element 62. The second window 354 has a sensor side 355, and an opposite optical element side 353. The ends of the second window 354 are each positioned in the mounting block 332 through a pair of passages 304A and 304B. Each passage 304A and 304B is formed in the mounting block 332 to slidingly and matingly receive the second window 354. The retention plate assembly 362A and 362B (FIG. 11) and pressure block 370 (FIG. 11) are assembled to the mounting block 332 and serve to apply an adjustable compressive force, generally indicated by the numeral 312, to the second window 354 causing the second window 354 to assume an arcuately shaped configuration or given curvature. The second window 354 is oriented so that a secant passing through the second window 354 may be positioned on either the sensor side 355 or the optical element side 353. The curvature in the second window 354 transforms the window 354 into a substantially anisotropic lens which has been found to be useful in adjusting the field of view of the present invention. The second window 354 in its component form is known in the art as a "trim window" which refers to an optical window which is selected with a frequency response which substantially matches the second wavelength component. The second window 354 is constructed of material that can withstand the compressive force 312. The second window 354 is formed using optical materials known in the art including but not limited to glass, polycarbonate, acetal, polystyrene, and acrylic. A coating may also be applied to the second window 354 to modify optical transmission or reflection characteristics without departing from the scope of this invention.

The third window 356 is configured to pass a substantial portion of the third wavelength component λ3 of electromagnetic energy 8 (FIG. 1) that is reflected by the first optical element 64 and reflected by the second optical element 62. The third window 356 has a sensor side 357 and an opposite optical element side 359. The ends of the third window 356 are each positioned in the mounting block 332 through a pair of passages 306A and 306B. Each passage 306A and 306B is formed in the mounting block 332 to slidingly and matingly receive the third window 356. The retention plate assembly 362A and 362B (FIG. 11) and pressure block 370 (FIG. 11) are assembled to the mounting block 332 and serve to apply an adjustable compressive force, generally indicated by the numeral 314, to the third window 356 causing the third window 356 to assume an arcuately shaped configuration or curvature. The third window 356 is oriented so that a secant passing through the third window 356 may be positioned on either the sensor side 357, or the optical element side 359. The curvature in the third window 356 transforms the window 356 into a substantially anisotropic lens which has been found to be useful to adjust the field of view in the invention. The third window 356 in its component form is known in the art as a "trim window" which refers to an optical window which is selected with a frequency response which substantially matches the third wavelength component. The third window 356 is constructed of material that can withstand the compressive force 314. The third window 356 is formed using optical materials known in the art including but not limited to glass, polycarbonate, acetal, polystyrene, and acrylic. A coating may also be applied to the third window 356 to modify optical transmission or reflection characteristics without departing from the scope of this invention.

The individual adjustment of the compressive force applied to the first, second, and third windows 360, 354 and 356 enables the selected field of view to be substantially matched between the sensors (FIG. 1). This also provides a means to align the field of view response for each wavelength component which will be discussed below.

Referring now to FIG. 11, the retention plate assembly 362A and 362B each comprises a retention plate 364; two attachment screws 368; and three adjustment screws 368. The retention plate 364 is formed to includes three lever portions 376 which act as spring or clamp elements when the retention plate assembly 362A and 362B is assembled to the mounting block 332 adjacent to the outer surface 333A and the opposite outer surface (not shown). In one embodiment, the retention plate 364 is formed from a 17-7 PH stainless steel material with 200,000 pounds per square inch tensile strength.

A pressure block 370 is inserted into each of the passages 302A&B, 304A&B, and 306A&B so that the flat surface of the pressure block 370 contacts the respective edge of the first, second, and third filters 360, 354, and 356. A plurality of mounting holes 378 are formed in the mounting block 332. The retention plate 364 is secured to the mounting block 332 with the aid of the attachment screws 368 that are each screw threadably inserted into each of the respective mounting holes 378. Each of the lever portions 376 are positioned in force transmitting relation, relative to the adjacent pressure block 370 which is positioned within its respective passage 302A&B, 304A&B, and 306A&B. Three adjustment screws 366 are each screw threadably borne by the retention plate 364. Each adjustment screw 366 has an end that is adjacent to its respective threads which contacts the surface of the mounting block 332. The magnitude of the compressive force 310, 312 and 314 is selected by rotation of the respective adjustment screw 366 to set the position of each respective lever portion 376 relative to the surface of the mounting block 332 and the respective pressure block 370. It will be appreciated from a study of FIG. 10 and FIG. 11 that when the respective adjustment screw 366 is fully withdrawn, the magnitude of the respective compressive force 310, 312 and 314 will be at its highest level, and when the respective adjustment screw 366 is fully engaged, the magnitude of the respective compressive force 310, 312 and 314 will be at its lowest level. It should be understood that the lever portion 376 is provided to improve the adjustment resolution of the adjustment screws 366 to aid in fine tuning the compressive force. However, one skilled in the art would readily recognize that there are other techniques for controlling and applying the needed compressive force without departing from the scope of this invention. For example, the compressive force could be generated directly by positioning the adjustment screw 366 in direct contact to the pressure block 370.

OPERATION

The operation of the present invention is believed to be readily apparent and is briefly summarized in the paragraphs which follow.

Referring now to FIG. 1 and FIG. 6, the first, second, third and fourth wavelength components $\lambda_1$, $\lambda_2$, $\lambda_3$, $\lambda_4$ of electromagnetic energy 8 propagate or travel along the incident axis 40. The electromagnetic energy 8 enters and propagates or travels through the lens 12, and travels or propagates as a convergent, divergent, or parallel beam through the aperture 26 which is formed in the plate 14. The first, second, third and fourth wavelength components $\lambda_1$, $\lambda_2$, $\lambda_3$, $\lambda_4$ propagate or pass along the incident axis 40, and encounter the fourth filter 52 mounted to the mounting block assembly 20. A substantial portion of the first, second, and third wavelength components $\lambda_1$, $\lambda_2$, $\lambda_3$ propagate or pass through the fourth filter 52 while other wavelengths may be blocked from passage depending on the optical characteristics of the fourth filter 52.

A substantial portion of the second, and third wavelength components $\lambda_2$, $\lambda_3$ are substantially reflected by the first surface 65 of the first optical element 64 and travels along a first axis 128. A substantial portion of the first wavelength component $\lambda_1$ travels or passes through the first optical element 64 along a first path 124 and emerges from the first optical element 64, and travels or propagates along a second axis 190 that is substantially parallel to the incident axis 40. The mirror 58 is positioned in intersecting relation to the axis 190, and is configured to reflect a substantial portion of the remaining first wavelength component $\lambda_1$ along a first image axis 192. The first filter 60 is positioned along the first image axis 192, and passes a substantial portion of the first wavelength component $\lambda_1$ of electromagnetic energy 8 therethrough, and reflects and/or absorbs a substantial portion of any remaining second and third wavelength components $\lambda_2$, $\lambda_3$ of electromagnetic energy 8 traveling along the first image axis 192. The first sensor 100 is located proximate to the first filter 60, and has a sensing surface 106 that is configured to convert electromagnetic energy 8 into a stream of electrical charges. The first sensor 100 is electrically coupled to the first interface circuit board 17 which provides clocking or timing signals to the first sensor 100, and further uses correlated double sampling data acquisition techniques and analog to digital conversion to provide digital data representing the measurement of the first wavelength components $\lambda_1$ that strike the sensing surface 106 of the first sensor 100.

Referring still to FIGS. 1 and 6, a substantial portion of the third wavelength component $\lambda_3$ of the electromagnetic energy 8 that propagate or travel along the axis 128 is reflected by the first surface 63 of the second optical element 62 so that it travels or propagates along the third image axis 130. The remaining third wavelength component $\lambda_3$ traveling along the image axis 130 interacts with the third filter 56 which passes or propagates a substantial portion of the third wavelength component $\lambda_3$ of electromagnetic energy 8 therethrough, and reflects and/or absorbs a substantial portion of any remaining first and second wavelength components $\lambda_1$, $\lambda_2$ of electromagnetic energy 8 traveling along the third image axis 130. The third sensor 102 is located proximate to the third filter 56, and has a sensing surface 108 that is configured to convert the electromagnetic energy 8 into a stream of electrical charges. The third sensor 102 is electrically coupled to the third interface circuit board 18 and further provides clocking or timing signals to the third sensor 102 and uses correlated double sampling data acquisition techniques and analog to digital conversion to provide digital data which represents the measurement of the third wavelength component $\lambda_3$ that strikes the sensing surface 108 of the third sensor 102.

The second wavelength component $\lambda_2$ travels or propagates through the second optical element 62 along the second path 140, and emerges from the second optical element 62, and travels or propagates along the second image axis 144 that is substantially parallel to the first axis 128. The remaining portion of the second wavelength component $\lambda_2$ interacts with the second filter 54 which is positioned along the second image axis 144. The second filter 54 passes or propagates a substantial portion of the second wavelength component $\lambda_2$ of electromagnetic energy 8 therethrough, and reflects and/or absorbs a substantial portion of any remaining first and third wavelength components $\lambda_1$, $\lambda_3$ of electromagnetic energy 8 traveling along the second image axis 144. The second sensor 104 is located proximate to the second filter 54, and has a sensing surface 110 that is configured to convert electromagnetic energy 8 into a stream of electrical charge. The second sensor 104 is electrically coupled to the second interface circuit board 16 and which provides clocking or timing signals to the second sensor 104, and further uses correlated double sampling data acquisition techniques and analog to digital conversion to provide digital data which represents the measurement of the second wavelength component $\lambda_2$ that strikes the sensing surface 110 of the second sensor 104.

Referring still to FIG. 6, the surfaces of the first and second optical elements 64 and 62 respectively are each positioned in substantial non-parallel relation, one relative to the other, to substantially reduce coma and astigmatism of the resulting measurement. For the first optical element 64, the angle $\gamma_1$ 151 describes the non-parallel relationship between the first surface 65 and the second surface 66. The angle $\gamma_1$ 151 is a function of the thickness $T_1$ 125, the angle $\beta_1$ 147, and the index of refraction $N_1$ 122 of the first optical element 64, and of the first wavelength component $\lambda_1$, and air equivalent distance, $P_1$, as measured along the propagation or traveling path of the first wavelength component $\lambda_1$ from the midpoint 126 of the path 124, to the sensing surface 106 of the first sensor 100.

For the second optical element 62, the angle $\gamma_2$ 153 describes the non-parallel relationship between the first surface 63 and the second surface 61. The angle $\gamma_2$ 153 is a function of the thickness $T_2$ 142, the angle $\beta_2$ 148, and the index of refraction $N_2$ 138 of the second optical element 62, and of the second wavelength component $\lambda_2$ air equivalent distance, $P_2$, measured along the propagation or traveling path of the second wavelength component $\lambda_2$ from the midpoint 141 of the path 140 to the sensing surface 110 of the second sensor 104.

Referring now to FIGS. 6 and 7, the orientation of the first, second, and third sensing surfaces 106, 110, and 108 are held in a substantially fixed position so as to ensure proper alignment between the first, second and third sensors 100, 104, and 102 respectively, and further so that the first, second and third air equivalent distances 230, 232, and 234 are substantially equal.

Referring now to FIGS. 2 through 5 a portion of the first surface 65 of the first optical element 64 is affixed to the pair of surfaces or troughs 46A and 46B by a gluing or bonding processes. The second surface 66 of the first optical element 64 is not affixed to the channel 46A and 46B, and is allowed to float within the clearance gap 94. The presence of the clearance gap 94, as earlier discussed, provides a space or area for expansion of the first optical element 64, while the first surface 65 of the first optical element 64 is held stationary relative to the mounting block 32. The second optical element 62 is similarly attached to the pair of surfaces or troughs 44A and 44B, and wherein the second surface 61 of the second optical element 62 is allowed to float within the clearance gap 95.

If desired, the alignment of the field of view between wavelength components may be improved using the elements and techniques shown in FIG. 10 and FIG. 11 and described earlier in this specification. The field of view for each sensor is adjusted by rotation of the respective adjustment screw 366 that corresponds with the first, second, or third windows 360, 354 or 356. This adjustment allows the field of view for each sensor to be adjusted so that it closely approximates the field of view for the other sensors.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for measuring first, second, and third wavelength components of electromagnetic energy propagating along an incident axis, comprising:
   a first optical element positioned in intersecting relation relative to the incident axis, and having a first surface and an opposite second surface, and wherein the first surface and second surface are each positioned in substantially non-parallel relation one relative to the other, and wherein the first surface reflects a substantial portion of the second and third wavelength components of the electromagnetic energy along a first axis, and wherein the first wavelength component travels through the first optical element along a first path, and wherein the first wavelength component emerges from the first optical element and travels along a second axis that is substantially parallel to the incident axis;
   a second optical element positioned in intersecting relation to the first axis, and having a first surface and an opposite second surface, and wherein the first surface and the second surface are each positioned in substantially non-parallel relation one relative to the other, and further wherein the first surface is configured to reflect a substantial portion of the third wavelength component of the electromagnetic energy along a third image axis, and wherein the second wavelength component travels through the second optical element along a second path, and wherein the second wavelength component emerges from the second optical element and travels along a second image axis that is substantially parallel to the first axis;
   a first sensor having a sensing surface, and positioned in receiving relation to the first wavelength component;
   a second sensor having a sensing surface, and positioned in receiving relation to the second wavelength component;
   a third sensor having a sensing surface, and positioned in receiving relation to the third wavelength component;
   and wherein the first surface of the first optical element and the first surface of the second optical element are positioned in substantially parallel, predetermined spaced relation, one relative to the other.

2. The apparatus as claimed in claim 1, and further comprising:
   a mirror positioned in intersecting relation relative to the third axis, and configured to reflect the first wavelength component along a first image axis;
   a first filter positioned along the first image axis, and configured to pass a substantial portion of the first wavelength component of electromagnetic energy therethrough, and further is configured to reflect and/or absorb a substantial portion of the second and third wavelength components of electromagnetic energy;
   a second filter positioned along the second image axis, and which is configured to pass a substantial portion of the second wavelength component of electromagnetic energy therethrough, and further is configured to reflect and/or absorb a substantial portion of the first and third wavelength components of electromagnetic energy; and
   a third filter positioned along the third image axis, and which is configured to pass a substantial portion of the third wavelength component of electromagnetic energy therethrough, and further is configured to reflect and/or absorb a substantial portion of the first and second wavelength components of electromagnetic energy.

3. The apparatus as claimed in claim 2, and further comprising:
   a mounting block having a first and an opposite second wall, and wherein each wall has an outer peripheral surface, and a first face, and an opposite second face defining a channel or passageway, therebetween, and wherein the incident axis passes through the channel or passageway and wherein the mirror, first filter, second filter and third filter are each borne by the outer peripheral surface of the first and second wall of the mounting block.

4. The apparatus as claimed in claim 3, and wherein a first planar boundary is defined on the first face of the first wall, and bounded by the intersection of the first optical element to the first face of the first wall, and further extends along the intersection of the mirror and the first face of the first wall, and continues to the intersection of the first filter and the first face of the first wall, and additionally extends to the first optical element along the first face of the first wall, and wherein the first planar boundary is substantially triangular shaped; and wherein a second planar boundary is defined on the first face of the first wall, and bounded by the intersection of the first optical element to the first face of the first wall, and further extends along the intersection of the third filter and the first face of the first wall, and additionally continues along the intersection of the second optical element to the first face of the first wall, and extends along the first face of the first wall to the first optical element, and wherein the second planar boundary has a shape similar to a parallelogram; and wherein a third planar boundary is defined on the first face of the first wall, and is further bounded by the intersection of the second optical element to the first face of the first wall, and additionally extends along the intersection of the second filter to the first face of the first wall, and along the first face of the first wall to the second optical element, and wherein the third planar boundary is substantially triangular shaped.

5. The apparatus as claimed in claim 4, and further comprising:
   a plate having a first face and an opposite second face, and which defines an aperture, and wherein the plate is positioned so that the incident axis passes through the aperture, and wherein the first face of the plate is positioned in substantially perpendicular relation relative to the incident axis, and wherein the mounting block is borne by the first face of the plate;
   and wherein the mounting block further comprises:
   first and second optical element mounting surfaces formed into the first and second wall and along each of the first faces, and wherein each of the mounting surfaces are configured to slidingly receive each of the first and second optical elements, and secure a portion of the first surface of each of the first and second optical elements to the first and second optical element mounting surfaces respectively, and wherein the mounting block is further configured to provide a first and second clearance gap to accommodate each of the second surfaces of the first and second optical elements; and a first and second filter mounting surface formed along the outer peripheral surfaces of the first and second wall of the mounting block, and wherein each of the first and second filters are borne by the respective mounting surface, and further wherein the first sensor is borne by the first filter, and wherein the second sensor is borne by the second filter.

6. The apparatus as claimed in claim 5, and wherein a portion of the first surface of the first optical element is secured to the first face of the first and second walls of the mounting block, and wherein the second surface of the first optical element is not constrained by the first face of the first and second walls of the mounting block.

7. The apparatus as claimed in claim 6, and wherein a first plane is parallel to the first face of the plate, and wherein the sensing surface of the third sensor defines a second plane, and wherein an angular offset between the first and second plane is defined in a direction along the incident axis, and wherein the angular offset is selected to minimize the Scheimpflug effect.

8. The apparatus as claimed in claim 7, further comprising:
a spacing block positioned adjacent to the mounting block and the plate, and which provides the angular offset.

9. The apparatus as claimed in claim 8, and wherein each of the first and second optical elements comprise a first coating formed on the first surface, and wherein the first coating is a dichroic coating.

10. The apparatus as claimed in claim 9, and wherein first and second optical elements further comprise a second coating formed on the second surface, and wherein the second coating is a dichroic coating.

11. The apparatus as claimed in claim 5, and wherein the first wavelength component has a spectral distribution, which is centered at approximately 460 nm, and further wherein the second wavelength component has a spectral distribution, which is centered at 540 nm, and further wherein the third wavelength component has a spectral distribution, which is centered at 615 nm.

12. The apparatus as claimed in claim 2, and further comprising:
a lens positioned along the incident axis, and wherein the lens has a midpoint;
a fourth filter positioned along the incident axis, and between the lens and the first surface of the first optical element, and which passes a substantial portion of the first, second, and third wavelength components of electromagnetic energy therethrough.

13. The apparatus as claimed in claim 12, and wherein a first air equivalent distance for the first wavelength component is defined from the intersection of the incident axis to the first surface of the first optical element, through the first optical element to the second surface of the first optical element, and from the second surface of the first optical element to the mirror, and from the mirror to the first filter, and through the first filter to the sensing surface of the first sensor;
and wherein a second air equivalent distance for the second wavelength component is defined from the intersection of the incident axis to the first surface of the first optical element, and extending to the first surface of the second optical element, and through the second optical element to the second surface of the second optical element, and to the second filter, and through the second filter, and to the sensing surface of the second sensor;
and wherein a third air equivalent distance for the third wavelength component is defined from the intersection of the incident axis to the first surface of the first optical element, and further extends to the first surface of the second optical element, and additionally extends from the first surface of the second optical element to the third filter, and through the third filter to the sensing surface of the third sensor;
and wherein each of the sensing surfaces of the first, second, and third sensors respectively are each positioned so that the first, second, and third air equivalent distances are substantially equal in value.

14. The apparatus as claimed in claim 2, and wherein the first optical element has a refractive index value for the first wavelength component, $N_1$, and wherein the first surface of the first optical element is positioned at an angle, $\beta_1$; and further wherein a first line is defined coincident to the first path and extends from the first surface of the first optical element to the second surface of the first optical element, and wherein the first line has a midpoint, and further wherein the first optical element has a thickness $T_1$ which measured at the intersection of the incident axis and the first surface, and further wherein the second optical element has a refractive index value for the second wavelength component, $N_2$, and wherein the first surface of the second optical element is positioned at the angle, $\beta_2$; and wherein a second line is defined coincident to the second path, and extends from the first surface of the second optical element to the second surface of the second optical element, and wherein the second line has a midpoint, and further wherein the second optical element has a thickness $T_2$ which is measured at the intersection of the first axis and the first surface of the second optical element, and wherein an air equivalent distance, $P_{1A}$, is defined and is substantially parallel to the second axis, and from the midpoint of the first line to the mirror; and wherein an air equivalent distance, $P_{1B}$, is defined parallel to the first image axis, and from the mirror, and through the first filter, and further extends to the sensing surface of the first sensor; and further wherein an air equivalent distance, $P_2$, is defined from the midpoint of the second line, and the measured parallel to the second image axis, and extends through the second filter, and to the sensing surface of the second sensor.

15. The apparatus as claimed in claim 14, and wherein the second surface of the first optical element is positioned at an angle, $\Theta$, relative to the second surface of the second optical element, and wherein the magnitude of the angle $\Theta$, measured in radians, is substantially defined by the relationship:

$$\theta = \frac{1}{2}\left[\frac{\sin\beta_1(\cos^2\beta_1)T_1}{(N_1^2 - \sin^2\beta_1)(P_{1A} + P_{1B})} + \frac{\sin\beta_2(\cos^2\beta_2)T_2}{(N_2^2 - \sin^2\beta_2)P_2}\right] + \left|\frac{\pi}{2} - (\beta_1 + \beta_2)\right|.$$

16. The apparatus as claimed in claim 14, and wherein the value of the angle $\beta_1$ is forty-five degrees, and wherein the value of the thickness, $T_1$ is equal to the value of the thickness, $T_2$, and wherein the second surface of the first optical element is positioned at an angle, $\Theta$, relative to the second surface of the second optical element, and wherein the angle $\Theta$, measured in radians, is substantially defined by the relationship:

$$\theta = \frac{T_1}{2\sqrt{2}}\left[\frac{1}{(2N_1^2 - 1)P_1} + \frac{1}{(2N_2^2 - 1)P_2}\right].$$

17. The apparatus as claimed in claim 5, and wherein the first wavelength component has a spectral distribution, which is centered at approximately 855 nm, and further wherein the second wavelength component has a spectral distribution, which is centered at 540 nm, and further wherein the third wavelength component has a spectral distribution, which is centered at 615 nm.

18. An apparatus for measuring first, second, and third wavelength components of electromagnetic energy propagating along an incident axis, comprising:
- a first optical element located in intersecting relation to the incident axis, and having a first surface and an opposite second surface, and wherein the first surface and the second surface are configured in substantially non-parallel relation, and further wherein the first surface is configured to substantially reflect the second and third wavelength components of the electromagnetic energy along a first axis, and is further configured to propagate the first wavelength component therethrough along a first path so that the first wavelength component emerges from the first optical element and propagates along a second axis that is parallel to the incident axis, and wherein the first path has a midpoint;
- a second optical element having a first surface and an opposite second surface, and wherein the first surface and the second surface are configured in substantially non-parallel relation, and further wherein the first surface is configured to substantially reflect the third wavelength component of the electromagnetic energy along a third image axis, and is further configured to propagate the second wavelength component therethrough along a second path, so that the second component of electromagnetic energy emerges from the second optical element and propagates along a second image axis, and wherein the second value has a midpoint;
- a first sensor having a sensing surface, and which is configured to receive the first wavelength component of electromagnetic energy which is propagated along a first image axis;
- a second sensor having a sensing surface, and which is configured to receive the second wavelength component of electromagnetic energy which is propagated along the second image axis; and
- a third sensor having a sensing surface, and which is configured to receive the third wavelength component of the electromagnetic energy which is propagated along the third image axis.

19. The apparatus as claimed in claim 18, and wherein the first optical element has a refractive index value for the first wavelength component, $N_1$, and a thickness, $T_1$, that is measured at the intersection of the incident axis relative to the first surface, and wherein the first optical element is oriented at an included angle $\beta_1$ which is measured between the first surface of the first optical element and substantially perpendicular to the second axis; and further wherein the second optical element has a refractive index value for the second wavelength component $N_2$, and a thickness, $T_2$, that is measured at the intersection of the first axis relative to the first surface, and wherein the second optical element is oriented at an included angle $\beta_2$ which is measured between the first surface of the second optical element and perpendicular to the second image axis; and wherein a first value, $P_1$, is substantially equal to an air equivalent travel distance of the first wavelength component measured from the midpoint of the first path, and along the second axis, and further along the first image axis to the sensing surface of the first sensor; and wherein a second value, $P_2$ is substantially equal to an air equivalent travel distance of the second wavelength component which is measured from the midpoint of the second path, and along the second image axis to the sensing surface of the second sensor.

20. The apparatus as claimed in claim 19, and wherein the second surface of the first optical element is positioned at an angle, $\Theta$, relative to the second surface of the second optical element, and wherein the magnitude of the angle $\Theta$ measured in radians is substantially defined by the relationship:

$$\theta = \frac{1}{2}\left[\frac{\sin\beta_1(\cos^2\beta_1)T_1}{(N_1^2 - \sin^2\beta_1)P_1} + \frac{\sin\beta_2(\cos^2\beta_2)T_2}{(N_2^2 - \sin^2\beta_2)P_2}\right] + \left|\frac{\pi}{2} - (\beta_1 + \beta_2)\right|.$$

21. The apparatus as claimed in claim 19, and wherein the first surface of the first optical element is oriented substantially parallel to the first surface of the second optical element.

22. The apparatus as claimed in claim 21, and wherein the thickness, $T_1$, of the first optical element is substantially equal to the thickness of the second optical element.

23. The apparatus as claimed in claim 22, and wherein the first surface of the first optical element is oriented at a substantially forty-five degree angle which is substantially perpendicular to the second axis so that $\beta 1$ is equal to about forty-five degrees.

24. The apparatus as claimed in claim 23, and wherein the second surface of the first optical element is positioned at an angle, $\Theta$, relative to the second surface of the second optical element, and wherein the magnitude of the angle $\Theta$, measured in radians, is substantially defined by the relationship:

$$\theta = \frac{T_1}{2\sqrt{2}}\left[\frac{1}{(2N_1^2 - 1)P_1} + \frac{1}{(2N_2^2 - 1)P_2}\right].$$

25. The apparatus as claimed in claim 24, and wherein the magnitude of the angle θ, in radians, has a value of less about 0.02 radians, and greater than about 0.005 radians.

26. The apparatus as claimed in claim 25, and wherein the magnitude of the angle θ, in radians, has a value substantially equal to 0.0113.

27. The apparatus as claimed in claim 23, and wherein the first and the second surfaces of the first optical element are positioned at an angle $\gamma_1$ relative one to another; and wherein the first and second surfaces of the second optical element are positioned at an angle $\gamma_2$; and wherein the ratio of the magnitude of the angle $\gamma_2$ to the magnitude of the angle $\gamma_1$ is less than about 3.0.

28. The apparatus as claimed in claim 18, and wherein a first wavelength propagation path is defined beginning from the intersection of the incident axis to the first surface of the first optical element and ending at the intersection of the first image axis and the first image sensor; and wherein a second wavelength propagation path is defined beginning from the intersection of the incident axis to the first surface of the first optical element and ending at the intersection of the second image axis and the second image sensor; and wherein a third wavelength propagation path is defined beginning from the intersection of the incident axis to the first surface of the first optical element and ending at the intersection of the third image axis and the third image sensor; and wherein a first value is substantially equal to the air equivalent distance of the first wavelength component propagation path; and wherein a second value is substantially equal to the air equivalent distance of the second wavelength component propagation path; and wherein a third value is substantially equal to the air equivalent distance of the third wavelength component propagation path; and wherein the first and second optical elements, and the first, second, and third sensors are fixedly positioned in relation to one another so that each of the first, second, and third values are substantially equal.

29. The apparatus as claimed in claim 28, and wherein the first wavelength component has a spectral distribution, and wherein the spectral distribution of the first wavelength component is centered at approximately 460 nm, and further wherein the second wavelength component has a spectral distribution, and wherein the spectral distribution of the second wavelength component is centered at about 540 nm, and further wherein the third wavelength component has a spectral distribution, and wherein the spectral distribution of the third wavelength component is centered at about 615 nm.

30. The apparatus as claimed in claim 28, and wherein the first wavelength component has a spectral distribution, and wherein the spectral distribution of the first wavelength component is centered at approximately 855 nm, and further wherein the second wavelength component has a spectral distribution, and wherein the spectral distribution of the second wavelength component is centered at about 540 nm, and further wherein the third wavelength component has a spectral distribution, and wherein the spectral distribution of the third wavelength component is centered at about 615 nm.

31. An apparatus for measuring first, second, and third wavelength components of electromagnetic energy propagating along an incident axis, comprising:
a first optical element positioned in intersecting relation relative to the incident axis, and having a first surface, and an opposite, second surface, and wherein the first and second surfaces are each positioned in substantially non-parallel relation one relative to the other, and wherein the first surface is configured to reflect a substantial portion of the second and third wavelength components of the electromagnetic energy along a first axis;
a second optical element positioned in intersecting relation relative to the first axis, and having a first surface, and an opposite second surface, and wherein the first and the second surfaces are each positioned in substantially non-parallel relation one relative to the other, and further wherein the first surface is configured to reflect a substantial portion of the third wavelength component of the electromagnetic energy;
and wherein a substantial portion of the first and second wavelength components pass through either one of the first optical element or the second optical element, and further wherein a preponderance of the third wavelength component is reflected by both the first optical element and the second optical element.

32. The apparatus as claimed in claim 31, and wherein the first surface of the first optical element is oriented substantially parallel to the first surface of the second optical element.

33. The apparatus as claimed in claim 32, and wherein the first surface of the first optical element is oriented at an included angle of about forty-five degrees relative to the first axis.

34. The apparatus as claimed in claim 33, and wherein the first wavelength component has a spectral distribution, which is centered at approximately 460 nm, and further wherein the second wavelength component has a spectral distribution, which is centered at about 540 nm, and further wherein the third wavelength component has a spectral distribution, is centered at about 615 nm.

35. The apparatus as claimed in claim 34, and wherein the first and the second surfaces of the first optical element are positioned at an angle $\gamma_1$ relative to each other; and wherein the first and second surfaces of the second optical element are positioned at an angle $\gamma_2$; and wherein the ratio of the magnitude of the angle $\gamma_2$ to the magnitude of the angle $\gamma_1$ is less than about 3.0.

36. The apparatus as claimed in claim 33, and wherein the first wavelength component has a spectral distribution, which is centered at approximately 855 nm, and further wherein the second wavelength component has a spectral distribution, which is centered at about 540 nm, and further wherein the third wavelength component has a spectral distribution, is centered at about 615 nm.

37. A method for measuring first, second, and third wavelength components of electromagnetic energy propagating along an incident axis, comprising:
providing a first and second optical element each having first and opposite second surfaces which are oriented in non-parallel relation relative one to another;
passing a substantial portion of the first wavelength component of the electromagnetic energy through the first optical element;
reflecting a substantial portion of the second wavelength component of electromagnetic energy by the first optical element and passing a substantial portion of second wavelength component of electromagnetic energy through the second optical element;
reflecting a substantial portion of the third wavelength component of electromagnetic energy by both the first and second optical elements.

38. The method for measuring as claimed in claim 37, further comprising:
orienting each of the first surfaces of the first and the second optical elements in substantially parallel spaced relation, one relative to the other.

39. The method for measuring as claimed in claim 38, further comprising:
orienting the first surface of the first optical element to direct the reflected portion of the second and third wavelength components of electromagnetic energy along a first axis that is oriented in a substantially perpendicular direction relative to the incident axis.

40. The method for measuring as claimed in claim 39, and further comprising:
orienting the second surfaces of the first and second optical elements at an angle with respect to one another, and which has a value that is greater than about 0.005 radians.

41. The method for measuring as claimed in claim 40, and further comprising:
orienting the second surfaces of the first and second optical elements at an angle with respect to one another, and wherein the angle has a value that is less than about 0.02 radians.

42. The method for measuring as claimed in claim 41, and wherein the first wavelength component has a spectral distribution which is centered at approximately 460 nm, and further wherein the second wavelength component has a spectral distribution which is centered at about 540 nm, and further wherein the third wavelength component has a spectral distribution which is centered at about 615 nm.

43. The method for measuring as claimed in claim 41, and wherein the first wavelength component has a spectral distribution which is centered at approximately 815 nm, and further wherein the second wavelength component has a spectral distribution which is centered at about 540 nm, and further wherein the third wavelength component has a spectral distribution which is centered at about 615 nm.

44. The method for measuring as claimed in claim 37, and further comprising:

providing first, second, and third windows;

passing the first wavelength component of electromagnetic energy that passed through the first optical element through the first window;

passing the second wavelength component of electromagnetic energy that was reflected by the first optical element and passed through the second optical element through the second window;

passing the third wavelength component of electromagnetic energy that was reflected by both the first and second optical elements through the third window; and applying an adjustable compressive force to one of the first, second, or third windows to impart a curvature to the first, second, or third windows.

45. An apparatus for measuring first, second, and third wavelength components of electromagnetic energy propagating or traveling along an incident axis, comprising:

a first optical element having a first and an opposite second non-parallel surface;

a second optical element having a first and an opposite second non-parallel surface; and wherein the first and second optical elements have an optical coating where a substantial portion of the first wavelength component is passed by the first optical element, a substantial portion of the second wavelength component is reflected by the first optical element and is passed by the second optical element, and a substantial portion of the third wavelength component is reflected by both the first and second optical elements;

a first sensor positioned in receiving relation to the first wavelength component;

a second sensor positioned in receiving relation to the second wavelength component; and a third sensor positioned in receiving relation to the third wavelength component.

46. The apparatus for measuring as claimed in claim 45, and further comprising:

a first filter positioned proximate to the first sensor, and wherein a substantial portion of the first wavelength component is passed by the first filter, and a substantial portion of remaining second and third wavelength components are reflected by the first filter;

a second filter positioned proximate to the second sensor, and wherein a substantial portion of the second wavelength component is passed by the second filter, and a substantial portion of remaining first and third wavelength components are reflected by the second filter; and a third filter positioned proximate to the third sensor, and wherein a substantial portion of the third wavelength component is passed by the third filter, and a substantial portion of remaining first and second wavelength components are reflected by the third filter.

47. The apparatus for measuring as claimed in claim 46, and further comprising:

a first window positioned between the first optical element and the first sensor;

a second window positioned between the second optical element and the second sensor;

a third window positioned between the second optical element and third sensor;

and wherein one of the first, second, or third windows is curved.

48. The apparatus for measuring as claimed in claim 47, and further comprising means for applying an adjustable compressive force to one of the first, second, or third windows to impart a curvature to same.

49. The apparatus for measuring as claimed in claim 48, and further comprising:

a mounting block having an outer and opposite outer surface, and which positions the first and second optical elements, and the first, second, and third windows one relative to another;

a plurality of pressure blocks each positioned in force transmitting relation relative to one of the first, second, or third windows;

a retention plates, and wherein one retention plate is fastened to the outer surface of the mounting block, which is disposed in force transmitting relation relative to at least one of the pressure blocks;

a plurality of adjustment screws threadably fastened to the pair of retention plate;

and wherein each of the plurality of adjustment screws is operable to apply the adjustable compressive force to one of the first, second, or third windows.

* * * * *